(12) United States Patent
Takeguchi et al.

(10) Patent No.: US 7,479,341 B2
(45) Date of Patent: Jan. 20, 2009

(54) FUEL CELL, SEPARATOR PLATE FOR A FUEL CELL, AND METHOD OF OPERATION OF A FUEL CELL

(75) Inventors: Shinsuke Takeguchi, Osaka (JP); Kazuhito Hatoh, Osaka (JP); Hideo Ohara, Katano (JP); Hisaaki Gyoten, Shijonawate (JP)

(73) Assignee: Panasonic Corporation, Osaka (JP)

( * ) Notice: Subject to any disclaimer, the term of this patent is extended or adjusted under 35 U.S.C. 154(b) by 353 days.

(21) Appl. No.: 10/752,223

(22) Filed: Jan. 7, 2004

(65) Prior Publication Data

US 2004/0157103 A1 Aug. 12, 2004

(30) Foreign Application Priority Data

Jan. 20, 2003 (JP) .............................. 2003-011139

(51) Int. Cl.
*H01M 8/04* (2006.01)
(52) U.S. Cl. .............................. 429/34; 429/22; 429/32; 429/35; 429/38; 429/39
(58) Field of Classification Search ........................ None
See application file for complete search history.

(56) References Cited

U.S. PATENT DOCUMENTS

| | | | |
|---|---|---|---|
| 4,810,595 A * | 3/1989 | Kahara et al. .................. 429/16 |
| 5,230,966 A * | 7/1993 | Voss et al. ..................... 429/26 |
| 5,376,472 A | 12/1994 | Hartvigsen et al. |
| 5,773,160 A * | 6/1998 | Wilkinson et al. ............. 429/13 |
| 5,840,438 A | 11/1998 | Johnson et al. |
| 5,998,054 A | 12/1999 | Jones et al. |
| 6,015,633 A | 1/2000 | Carlstrom, Jr. et al. |
| 6,025,084 A | 2/2000 | Kawasaki et al. |
| 6,159,629 A | 12/2000 | Gibb et al. |
| 6,277,511 B1 * | 8/2001 | Iwase et al. .................... 429/32 |
| 6,322,915 B1 * | 11/2001 | Collins et al. ................. 429/13 |
| 6,413,664 B1 | 7/2002 | Wilkinson et al. |
| 6,451,467 B1 | 9/2002 | Peschke et al. |
| 6,503,651 B1 | 1/2003 | Nguyen |
| 6,593,022 B1 | 7/2003 | McLean |

(Continued)

FOREIGN PATENT DOCUMENTS

JP 2001143740 5/2001

(Continued)

*Primary Examiner*—Jonathan Crepeau
*Assistant Examiner*—Tony Chuo
(74) *Attorney, Agent, or Firm*—Dickinson Wright, PLLC

(57) ABSTRACT

A fuel cell includes a stack of unit cells, each including: a hydrogen-ion conductive polymer electrolyte membrane; an anode and a cathode sandwiching the polymer electrolyte membrane; an anode-side conductive separator plate having a gas flow path for supplying and discharging a fuel gas to and from the anode; and a cathode-side conductive separator plate having a gas flow path for supplying and discharging an oxidant gas to and from the cathode. At least one of the anode-side and cathode-side separator plates has, in one face thereof, a plurality of independent gas flow channels, which constitute the gas flow path. When the fuel cell is operated at low load, the fuel gas or the oxidant gas is supplied to one or more of the plurality of independent gas flow channels, so that the fuel cell is capable of securing sufficient gas velocity.

16 Claims, 17 Drawing Sheets

U.S. PATENT DOCUMENTS

| | | |
|---|---|---|
| 6,602,628 B2 | 8/2003 | Ueda et al. |
| 6,607,858 B2 | 8/2003 | Wozniczka et al. |
| 6,638,658 B1 | 10/2003 | McLean |
| 6,650,968 B2 | 11/2003 | Hallum et al. |
| 2001/0004501 A1 | 6/2001 | Yi et al. |
| 2001/0019792 A1 | 9/2001 | Wozniczka et al. |
| 2002/0146611 A1 | 10/2002 | Kawasaki et al. |
| 2003/0003345 A1 | 1/2003 | Ohara et al. |
| 2003/0082433 A1* | 5/2003 | Sano et al. .................. 429/39 |
| 2003/0118878 A1 | 6/2003 | Pinto |
| 2003/0129473 A1 | 7/2003 | Lee et al. |
| 2003/0134180 A1 | 7/2003 | Hori et al. |
| 2003/0175577 A1 | 9/2003 | Rock |
| 2003/0203260 A1 | 10/2003 | Lee |
| 2003/0203271 A1 | 10/2003 | Morse et al. |
| 2003/0215694 A1 | 11/2003 | Nomura et al. |
| 2004/0071865 A1* | 4/2004 | Mosdale et al. ............. 427/115 |

FOREIGN PATENT DOCUMENTS

| | | | |
|---|---|---|---|
| JP | 2002050392 | | 2/2002 |
| JP | 2002-083610 | * | 3/2002 |
| JP | 2002083610 | | 3/2002 |
| WO | WO 02/054522 | * | 7/2002 |

* cited by examiner

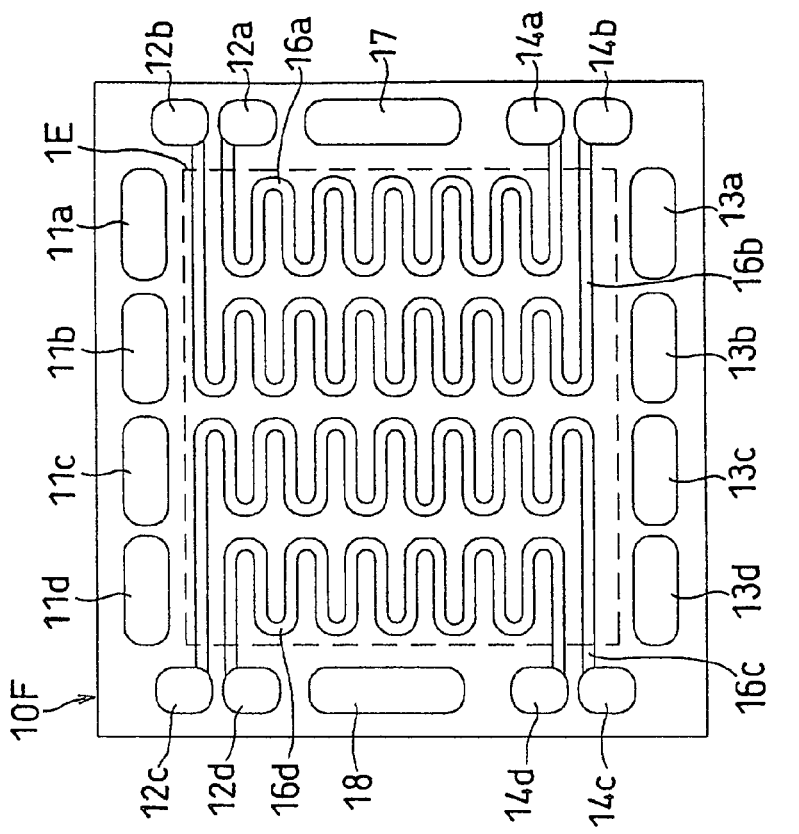
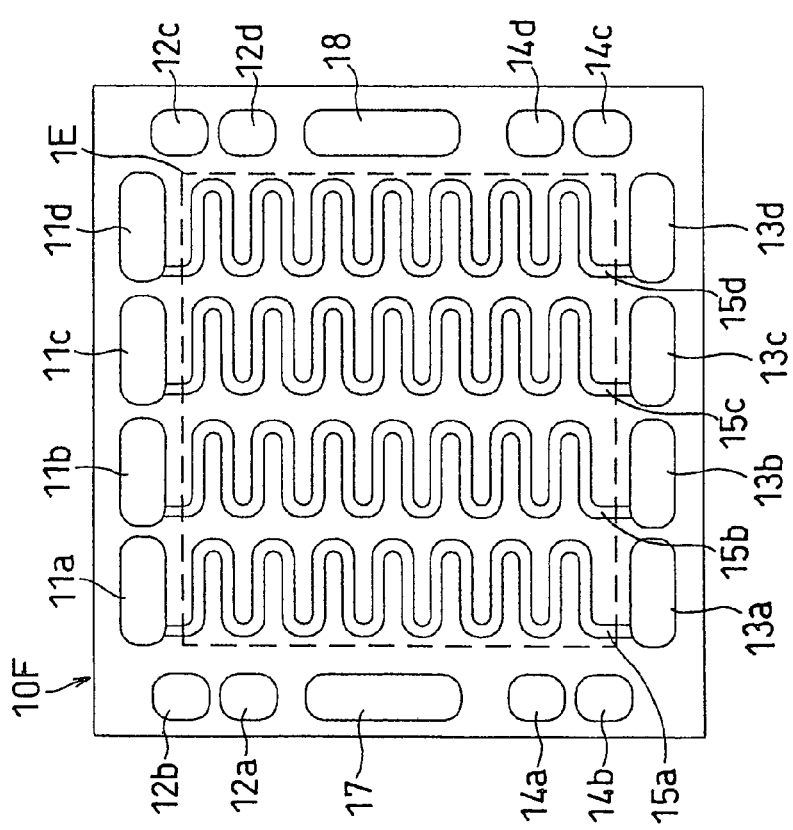

FUEL CELL, SEPARATOR PLATE FOR A FUEL CELL, AND METHOD OF OPERATION OF A FUEL CELL

FIELD OF THE INVENTION

The present invention relates to fuel cells for use in portable power sources, electric vehicle power sources, domestic cogeneration systems or the like, and, more particularly, to fuel cells including a polymer electrolyte membrane and an operation method thereof.

RELATED ART OF THE INVENTION

A fuel cell including a polymer electrolyte membrane generates electric power and heat simultaneously by electrochemically reacting a fuel gas containing hydrogen with an oxidant gas containing oxygen, such as air. The fuel cell essentially comprises a polymer electrolyte membrane that selectively transports hydrogen ions and a pair of electrodes (anode and cathode) formed on both sides of the polymer electrolyte membrane. The electrode is composed of a catalyst layer formed on each side of the polymer electrolyte membrane and a gas diffusion layer formed on the outer face of the catalyst layer. The catalyst layer is composed mainly of a carbon powder carrying a platinum group metal catalyst, and the gas diffusion layer has excellent gas permeability and electronic conductivity.

In order to prevent the supplied fuel gas and oxidant gas from leaking out and mixing together, gas sealing materials or gaskets are arranged around the electrodes so as to sandwich the polymer electrolyte membrane. The gas sealing materials or gaskets are combined integrally with the electrodes and the polymer electrolyte membrane beforehand. This combined structure is called an electrolyte membrane-electrode assembly (MEA). Disposed outside the MEA are conductive separator plates for mechanically securing the MEA and connecting adjacent MEAs electrically in series. The separator plates have, at the portion contacting the MEA, a gas flow channel for supplying a reactive gas to the electrode surface and discharging generated water and surplus gas. Although the gas flow channel may be provided independently of the separator plate, grooves are usually formed in the surface of the separator plate to provide the gas flow channel.

In order to supply the fuel gas or the oxidant gas to the grooves, it is necessary to use a piping jig which, depending on the number of the separator plates, branches off from the supply pipe of the fuel gas or the oxidant gas into the grooves of the separator plates. This jig is called a "manifold," and the above-described type of manifold, connecting the supply pipe of the fuel gas or the oxidant gas with the grooves of the separator plates, is called an "external manifold." A manifold having a simpler structure is called an "internal manifold." The internal manifold includes through-holes that are formed in the separator plates with the gas flow channel. The through-holes are connected to the inlet and outlet of the gas flow channel so that the fuel gas or the oxidant gas is supplied directly from these holes to the gas flow channel.

Since the fuel cell generates heat during operation, it is necessary to cool the fuel cell with cooling water or the like, in order to keep the cell under good temperature conditions. A cooling section for flowing cooling water therein is usually provided every one to three unit cells. The cooling section is inserted between the separator plates in one type of cooling configuration, and the cooling section is provided by forming a cooling water flow channel in the backside of the separator plate in another type of cooling configuration. The latter type is often employed. The MEAs, the separator plates, and the cooling sections are alternately stacked to form a stack of 10 to 200 cells, and a current collector plate and an insulator plate are attached to each end of the cell stack. The resultant stack is sandwiched between end plates and clamped with clamping rods from both ends. This is the structure of a typical fuel cell.

The polymer electrolyte membrane of such a fuel cell is generally made of a perfluorocarbon sulfonic acid material. Since this polymer electrolyte membrane exhibits ionic conductivity when moistened with water, the fuel gas and the oxidant gas usually need to be humidified when supplied. Also, water is produced by the reaction on the cathode side. Thus, if a supplied gas is humidified so as to have a dew point higher than the operating temperature of the fuel cell, condensation occurs on the gas flow channel inside the cell and inside the electrode. As a result, the cell performance becomes both unstable and degraded due to water clogging or the like. This phenomenon of cell performance degradation and operational instability due to excessive wetting is generally called a "flooding" phenomenon.

When the fuel cell is used as a power generation system, the fuel cell needs to be integrated with other facilities, such as a humidifier of the supplied gases, to form a system. In order to simplify the system and improve the system efficiency, it is preferable to reduce the humidification of the supplied gases and lower their dew points.

As described above, from the viewpoints of prevention of the flooding phenomenon, improvement of system efficiency, and simplification of the overall system, it has been a common practice to humidify the supplied gases such that their dew points are somewhat lower than the cell temperature.

However, heightening the cell performance requires an improvement in the ionic conductivity of the polymer electrolyte membrane. It is therefore preferable to humidify the supplied gases such that they have a relative humidity close to or higher than 100%. Further, the present inventors have found that highly humidifying the supplied gases increases the durability of the polymer electrolyte membrane. However, supplying gases having a relative humidity close to 100% presents the following problems.

First, the aforementioned flooding occurs. A common approach to avoiding flooding is to increase the pressure loss of the supplied gases to blow the condensed water off. However, the increase in the pressure loss of the supplied gases causes an extreme increase in the power of auxiliaries of the system, such as a gas blower or a compressor, thereby inviting a decrease in system efficiency.

Second, the wettability (contact angle) of the gas diffusion layer and the carbon carrying the catalyst layer by water changes with time, so that the discharging efficiency of the condensed water lowers with time, affecting cell durability.

Third, the wettability (contact angle) of the gas diffusion layer and the carbon carrying the catalyst layer changes with time, resulting in a time variance in the ratio of the flow rate of the gas flowing through the gas diffusion layer to the flow rate of the gas flowing through the gas flow channel of the separator plate. Specifically, the wettability of the gas diffusion layer increases with time, leading to an increase in the amount of stagnant condensed water in the gas diffusion layer. Accordingly, the supply of gas to the electrode is locally hindered, which causes a decrease in current density in the area where the gas supply is hindered. Therefore, the difference in the current density increases within a unit cell, consequently lowering the characteristics of the whole fuel cell.

Fourth, the time-varying change in the ratio of the gas flow rate of the gas flowing through the gas diffusion layer to the flow rate of the gas flowing through the gas flow channel of the separator plate changes the proportion of "underflow." The term "underflow" as used herein refers to the flow of gas passing through the gas diffusion layer between adjacent flow channels of the separator plate. If there were no gas diffusion layer, all of the supplied gas would flow along the gas flow channel. In fact, however, because of the existence of the gas diffusion layer adjacent to the gas flow channel, some of the supplied gas flows through the gas diffusion layer between adjacent flow channels, particularly in the case of a serpentine-type gas flow channel. For example, in a continuous serpentine-type gas flow channel, consisting of linear parts and turn parts, the direction of gas flowing through one linear part is opposite to the direction of gas flowing through the adjacent linear part. Thus, the underflow of gas passing through the gas diffusion layer occurs in such a manner as to balance the pressure loss of gas flowing from upstream to downstream through the one linear part and the pressure loss of gas flowing through the gas diffusion layer under the rib between the adjacent linear parts from upstream to downstream.

However, the increase in the wettability of the gas diffusion layer with time and the corresponding increase in the amount of stagnant condensed water in the gas diffusion layer cause a phenomenon that the underflow of gas flowing through the gas diffusion layer is hindered. This phenomenon occurs more frequently at an area where the pressure loss of the gas between the adjacent gas flow channels is smaller. Thus, in the case of the serpentine-type flow channel, the amount of underflow through the gas diffusion layer decreases with time near the turn parts of the gas flow channel, thereby resulting in a decrease in the current density in the area of the gas diffusion layer where the gas supply is hindered. Therefore, the difference in current density increases within a unit cell, consequently lowering the characteristics of the whole fuel cell.

Further, if the flooding phenomenon occurs on the anode side, the fuel gas becomes depleted, a condition that is fatal to the cell. In such a condition of shortage of the fuel gas, if a load current is forcibly drawn from the cell, electrons and protons are produced without the fuel. These electrons and protons are produced because the carbon carrying the anode catalyst reacts with water in the surrounding atmosphere. As a result, the anode catalyst layer is destroyed due to the loss of carbon from the catalyst layer. Therefore, extreme care should be taken to avoid anode-side flooding.

Also, it is desirable that this fuel cell system be capable of both low load operation, to reduce the output according to the demand for electric power, and rated output operation. The low load operation must be performed at the same utilization rates of the fuel gas and the oxidant gas as those of the rated operation in order to retain the efficiency. Specifically, if the load is reduced to half that of the rated operation, for example, the flow rates of the fuel gas and the oxidant gas must also be reduced to about half those of the rated operation; otherwise, extra fuel and oxidant gases will be used, resulting in a decrease in power generating efficiency. However, if the low load operation is performed with the gas utilization rates constant, the velocity of the gas flowing through the gas flow channel decreases, so that the condensed water and generated water are not discharged to the outside of the separator plate. Therefore, the above-described flooding phenomenon occurs, and the cell performance becomes degraded or unstable.

BRIEF SUMMARY OF THE INVENTION

In view of the above problems, an object of the present invention is to provide a highly reliable polymer electrolyte fuel cell that is significantly free from cell performance degradation or instability that tends to be caused by clogging of gas flow channels with condensed water and generated water during a low load operation.

In order to solve the above problems, the present invention provides a highly reliable polymer electrolyte fuel cell capable of securing sufficient gas velocity by forming a plurality of independent gas flow channels in one face of a separator plate and limiting the gas supply region in a low load operation.

A fuel cell in accordance with the present invention is formed of a stack of unit cells. Each unit cell includes: a hydrogen-ion conductive polymer electrolyte membrane; an anode and a cathode sandwiching the polymer electrolyte membrane. An anode-side conductive separator plate has a gas flow path for supplying and discharging a fuel gas to and from the anode; and a cathode-side conductive separator plate has a gas flow path for supplying and discharging an oxidant gas to and from the cathode. At least one of the anode-side and cathode-side separator plates has, in one face thereof, a plurality of independent gas flow channels which constitute the gas flow path. A gas-supply switching controller is provided for supplying the fuel gas or the oxidant gas to one or more of the plurality of independent gas flow channels.

The regions in which the independent gas flow channels are located may be different or the same in area (size), as necessary. The "area" refers to the projection of the channels on the plane of the separator plate. If the cross-sections of the different flow channels are generally the same, the different projected areas indicates that the channels are of different lengths. In any event, the flow channels may have the same or different total volumes.

The anode and the cathode can include a catalyst layer and a gas diffusion layer and the catalyst layer and/or the gas diffusion layer of the anode or the cathode adjacent to at least one of the anode-side and cathode-side separator plates can be divided into a plurality of sections in agreement with the plurality of independent gas flow channels.

The independent gas flow channels may be provided in either the anode-side separator plate or the cathode-side separator plate, or in both the anode-side and cathode-side separator plates.

The fuel cell in accordance with the present invention further includes a combination separator plate. The combination separator plate includes the above-described anode-side separator plate further having a cooling water flow path in the backside of the gas flow path and the above-described cathode-side separator plate further having a cooling water flow path in the backside of the gas flow path. These anode-side and cathode-side separator plates are combined together such that their cooling water flow paths are combined to form one integral cooling water flow path. The integral cooling water flow path can include a plurality of independent flow channels in agreement with the plurality of independent gas flow channels.

The present invention also provides a method of operating a fuel cell, wherein the fuel gas or the oxidant gas is supplied to one or more of a plurality of independent gas flow channels by a gas-supply switching controller to perform a low load operation.

The method of operating the fuel cell can include the step of changing one or more of the plurality of independent gas flow channels to which the fuel gas or the oxidant gas is supplied at certain intervals of time in the low load operation.

Because the present invention can reduce clogging of the gas flow channel with water in a low load operation, it is possible to prevent cell performance degradation or instability in the low load operation.

The present invention also provides a separator plate for a fuel cell. The separator plate includes a first plate face having a plurality of independent gas flow channels disposed therein and a second plate face having a plurality of independent gas flow channels disposed therein.

The present invention further provides a separator plate assembly for a fuel cell, including a separator plate having a first plate face with a plurality of independent fluid flow channels disposed therein and a fluid regulator that selectively provides fluid to subsets of the fluid flow channels.

The present invention further provides a fuel cell that has a separator plate having a plurality of independent gas flow channels disposed therein and an electrode having a plurality of physically separated electrode sections each corresponding to a separate one of the plurality of independent gas flow channels, for the purpose of reacting a gas provided by the corresponding gas flow channel.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 19 is a front view of the anode side of a conductive separator plate of a fuel cell in Embodiment 9 of the present invention.

FIG. 20 is a front view of the cathode side of the separator plate of FIG. 19.

DETAILED DESCRIPTION OF EMBODIMENTS

Figure 2:
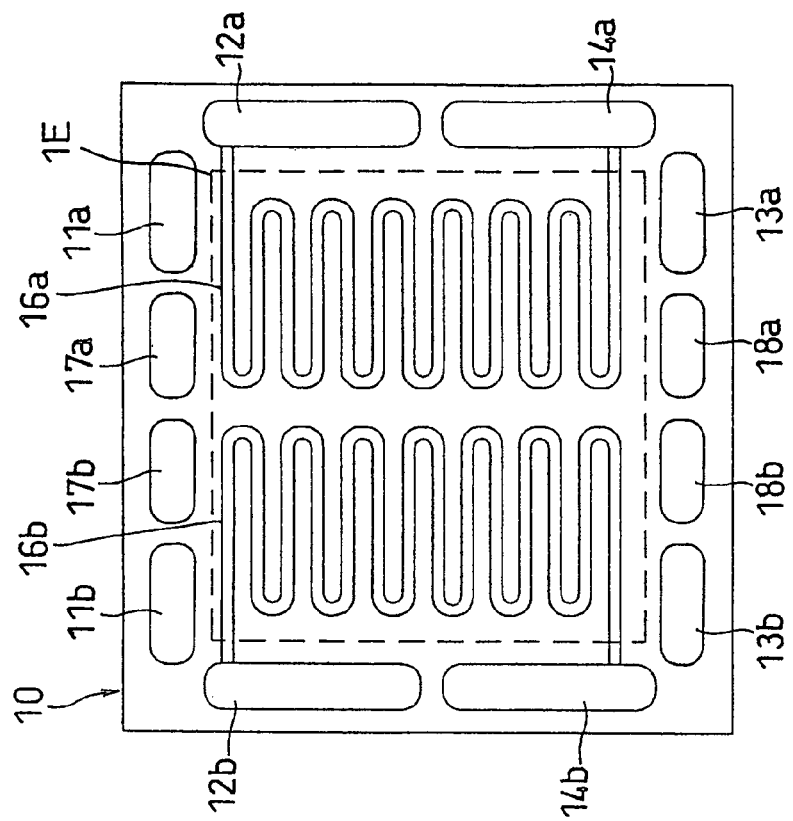
FIG. 2 is a front view of the cathode side of the separator plate of FIG. 1.

A fuel cell in accordance with the present invention includes a plurality of independent gas flow channels formed in one face of a separator plate. The fuel cell is capable of securing sufficient gas velocity in the separator plate channels by limiting the gas supply region in a low load operation.

A related art separator plate of a fuel cell is so configured that each of a fuel gas and an oxidant gas is supplied to a gas flow channel of the separator plate from one inlet-side manifold aperture and discharged from one outlet-side manifold aperture.

There is commercial demand for a fuel cell power generation system which enables changing of the load of the fuel cell, depending on the demand for electric power, without lowering the power generation efficiency. For this purpose, when increasing the load with respect to the rated output, it is desired for the operation of the fuel cell to correspondingly increase the flow rates of the fuel gas and the oxidant gas, and when decreasing the load with respect to the rated output, it is desired to correspondingly decrease the flow rates of the fuel gas and the oxidant gas.

The gas flow channel formed in a conductive separator plate may be designed such that the gas velocity is optimal at the rated output. Thus, when the power load is increased, an increase in the gas flow rate enhances the velocity of the gas flowing through the gas flow channel, and when the power load is decreased, a decrease in the gas flow rate lowers the velocity of the gas flowing through the gas flow channel. When the velocity of the gas flowing through the gas flow channel is increased, the condensed water and the generated water in the gas flow channel of the separator plate can be removed effectively, so that the flooding phenomenon does not occur. However, the power generation efficiency is slightly lowered by an increase in the power of auxiliaries when the velocity of the gas is increased in this manner, due to an increase in the pressure loss of the supplied gas. On the other hand, when the power load is decreased, a decrease in the gas flow rate lowers the gas velocity. When the velocity of the gas flowing through the gas flow channel is lowered, it becomes difficult, depending on the degree of lowering of the velocity, to effectively remove the condensed water and the generated water in the gas flow channel of the separator plate, so that the flooding phenomenon occurs. When the power load is decreased, if the flow rate of the supplied gas is not decreased, the ratio of the power of the auxiliaries to the power output increases relative to their ratios at the rated power output, resulting in a decrease in power generation efficiency of the whole power generation system.

The present invention realizes a fuel cell in which the flooding is prevented or significantly reduced, particularly in a low load operation, by forming a plurality of independent gas flow channels in one face of a separator plate. For example, when the load is assumed to vary only within the range of one-half to twice the rated power output, the separator plate may be configured to have four independent gas flow channels formed in one face thereof. Accordingly, when the fuel cell operates at its rated power generation, gas is supplied to two of the four gas flow channels, and, when the fuel cell operates at twice its rated power generation, gas is supplied to all of the gas flow channels. And when the fuel cell operates at half its rated power, gas is supplied to one of the four gas flow channels. This makes it possible to retain almost the same gas velocity in all of the gas flow channels even when the load is changed. When the actual load is changed from twice the rated load to half the rated load, for example, it is desirable to control both the number of gas flow channels to which gas is supplied and the gas flow rate, such that the gas velocities in the respective gas flow channels are maintained as constant as possible.

As another example, in the case where the load to varies only between the rated power output and lower power outputs, such as one-half and one-fourth the rated power generation, the separator plate may be configured to have four independent gas flow channels formed in one face thereof. When the fuel cell is operating at its rated power generation, the gas is supplied to all four gas flow channels, and when operating at half its rated power generation, the gas is supplied to two of the four gas flow channels. At the time of a ¼ low load operation, the gas is supplied to one of the four gas flow channels. This makes it possible to retain almost the same gas velocity in all of the gas flow channels even when the load is changed. Therefore, there is no need to supply the gas at a flow rate which is higher than the flow rate corresponding to the load, so that it becomes possible to change the power load while maintaining the optimal power generation efficiency.

It is desirable that the portion of an electrode to which the gas is supplied (i.e., the portion of an electrode where the electrode reaction takes place) through one or more flow channels, selected from the plurality of independent gas flow channels, is substantially the same in respective position and area on both the anode side and the cathode side. It is also desirable to provide a plurality of independent cooling water flow channels, so that the portion to which cooling water is supplied is also substantially the same in respective position and area as the portion where the electrode reaction takes place. If the cooling water is supplied to a cooling water flow channel adjacent to the electrode portion, to which the gas is not supplied and in which the electrode reaction is not taking place, the cooling water cannot efficiently absorb the heat generated by the reaction, because no heat is generated at the electrode portion in which the electrode reaction is not taking place. Therefore, the heat removal efficiency of the cooling system is lower when the cooling water is used as the heat source of a cogeneration system or the like and is supplied to a region in which the electrode reaction is not taking place.

At the electrode surface to which gas is not supplied, the electrode reaction does not occur. If gas oozes from the independent gas flow channel to which the gas is supplied, through the gas diffusion layer or the like, to the electrode surface adjacent to the gas flow channel to which the gas is not supplied, a current density distribution is created that depends on the amount of oozed gas, because the electrode is retained at the same potential through the whole surface. Thus, an excessive current does not flow through the electrode surface to which the gas is not supplied, and hence the problem of electrode deterioration due to oxidation and reduction does not occur.

Further, at the electrode surface to which the gas is not supplied, the electrode reaction does not occur, and there is almost no flow of the gas. Therefore, if the power generation is continued without supplying gas to a particular independent gas flow channel for a long period of time, water stagnates in the gas flow channel to which the gas is not supplied and the gas diffusion layer adjacent thereto. Thus, the next time gas is supplied to this particular gas flow channel to generate power, it takes considerable time to remove the stagnant water and refresh the wet electrode surface. It is thus desirable, in the operation of the fuel cell, to change the gas flow channel to which the gas is supplied at regular intervals, in order to avoid not supplying gas to a particular independent gas flow channel for a long period of time. By changing the gas flow channel to which the gas is supplied at regular intervals, in order to refresh the wet electrode surface adjacent to the gas flow channel not supplied with gas before the wetting of the electrode surface advances significantly, it is possible to suppress the advancement of the wetting of only a particular electrode surface.

Embodiments of the present invention are described below with reference to the drawings.

Embodiment 1

Figure 1:
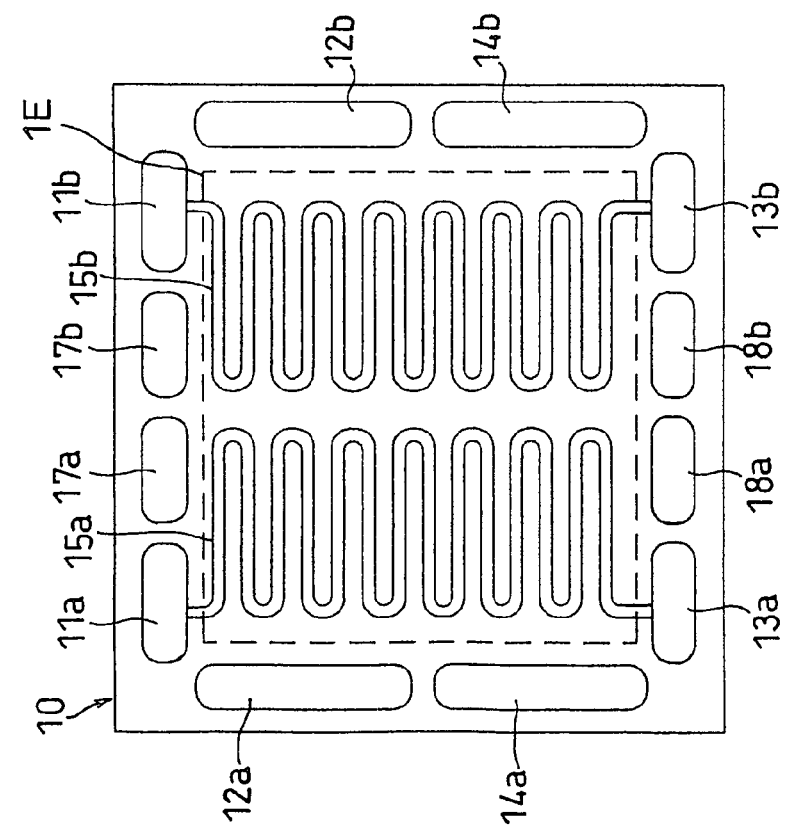
FIG. 1 is a front view of the anode side of a conductive separator plate of a fuel cell in Embodiment 1 of the present invention.
Figure 3:
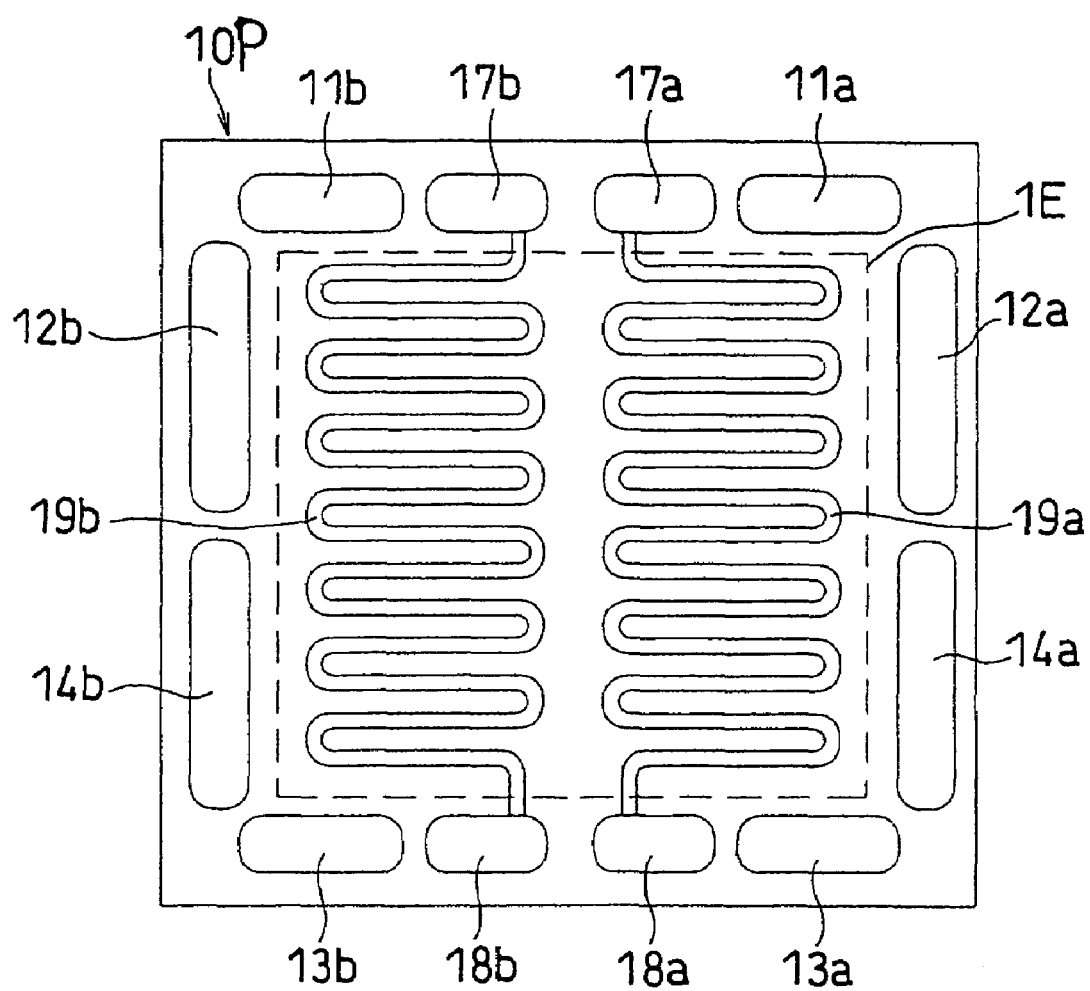
FIG. 3 is a back view of an anode side conductive separator plate of the fuel cell in Embodiment 1 of the present invention including a cooling section.

FIGS. 1, 2 and 3 illustrate separator plates of this embodiment. FIG. 1 is a front view of the anode facing side of a separator plate 10, and FIG. 2 is a back view thereof as well as a front view of the cathode facing side. FIG. 3 is a front view of a cathode facing side of an anode side separator plate 10P including a cooling section.

A separator plate 10 has fuel gas inlet-side manifold apertures 11*a* and 11*b*, fuel gas outlet-side manifold apertures 13*a* and 13*b*, oxidant gas inlet-side manifold apertures 12*a* and 12*b*, oxidant gas outlet-side manifold apertures 14*a* and 14*b*, cooling water inlet-side manifold apertures 17*a* and 17*b*, and cooling water outlet-side manifold apertures 18*a* and 18*b*. The separator plate 10 has, on the anode facing side, independent fuel gas flow channels 15*a* and 15*b* communicating with the inlet-side manifold apertures 11*a* and 11*b* and the outlet-side manifold apertures 13*a* and 13*b*, respectively. On the cathode facing side, the separator plate 10 has independent oxidant gas flow channels 16*a* and 16*b* communicating with the inlet-side manifold apertures 12*a* and 12*b* and the outlet-side manifold apertures 14*a* and 14*b*, respectively. The electrode of a membrane electrode assembly (MEA) comes in contact with the portion surrounded by a dotted line 1E.

In this embodiment, the fuel gas flow channel of separator plate 10 is divided into two independent fuel gas flow channels 15*a* and 15*b*, and the corresponding oxidant gas flow channel is divided into two independent oxidant gas flow channels 16*a* and 16*b*.

Separator plate 10 serves both as an anode-side conductive separator plate and a cathode-side conductive separator plate.

A separator plate having a cooling section includes a combination of an anode-side separator plate and a cathode-side separator plate. The anode facing side of anode side separator plate 10P has the same structure as that of separator plate 10 illustrated in FIG. 1, and FIG. 3 shows the backside of separator plate 10P, which is the cathode facing side. This cathode facing side has two independent cooling water flow channels 19*a* and 19*b* communicating with inlet-side manifold apertures 17*a* and 17*b* and outlet-side manifold apertures 18*a* and 18*b*, respectively, as shown in FIG. 3. The cathode facing side of the cathode side separator plate has the same structure as that of separator plate 10 illustrated in FIG. 2, and its backside, which is the anode facing side, is the mirror image of FIG. 3 and has two independent cooling water flow channels communicating with inlet-side manifold apertures and outlet-side manifold apertures in the same manner. The combination separator plate includes the anode-side separator plate and the cathode-side separator plate combined with each other such that their backsides having the cooling water flow channels face each other.

In order to assemble a cell stack, for example, the MEAs and the separator plates, serving both as an anode-side separator plate and a cathode-side separator plate, are alternately stacked. Every two cells, the combination separator plate having a cooling section is inserted instead of the separator plate serving both as an anode-side separator plate and a cathode-side separator plate.

A supply pipe and an exhaust pipe for each gas are connected to the respective manifold apertures of a fuel cell including the above cell stack. Each pipe branches into two parts immediately before/after the inlet/outlet of the fuel cell. The two branches of each pipe have the same diameter such that the gas is evenly distributed to the two gas flow channels of each cell. Also, an electromagnetic valve is installed in each pipe. By closing one of the two valves in the respective pipes, gas can be supplied and discharged to and from only one of the two independent gas flow channels. It is thus important that the lengths of the branches, of each respective pipe, are equal in order to equalize the pressure losses in the two branches. It is also important, in terms of providing even gas distribution, that the lengths of the two independent gas flow channels of the separator plate are equal, so as to equalize the pressure losses in the two independent gas flow channels.

Figure 4:
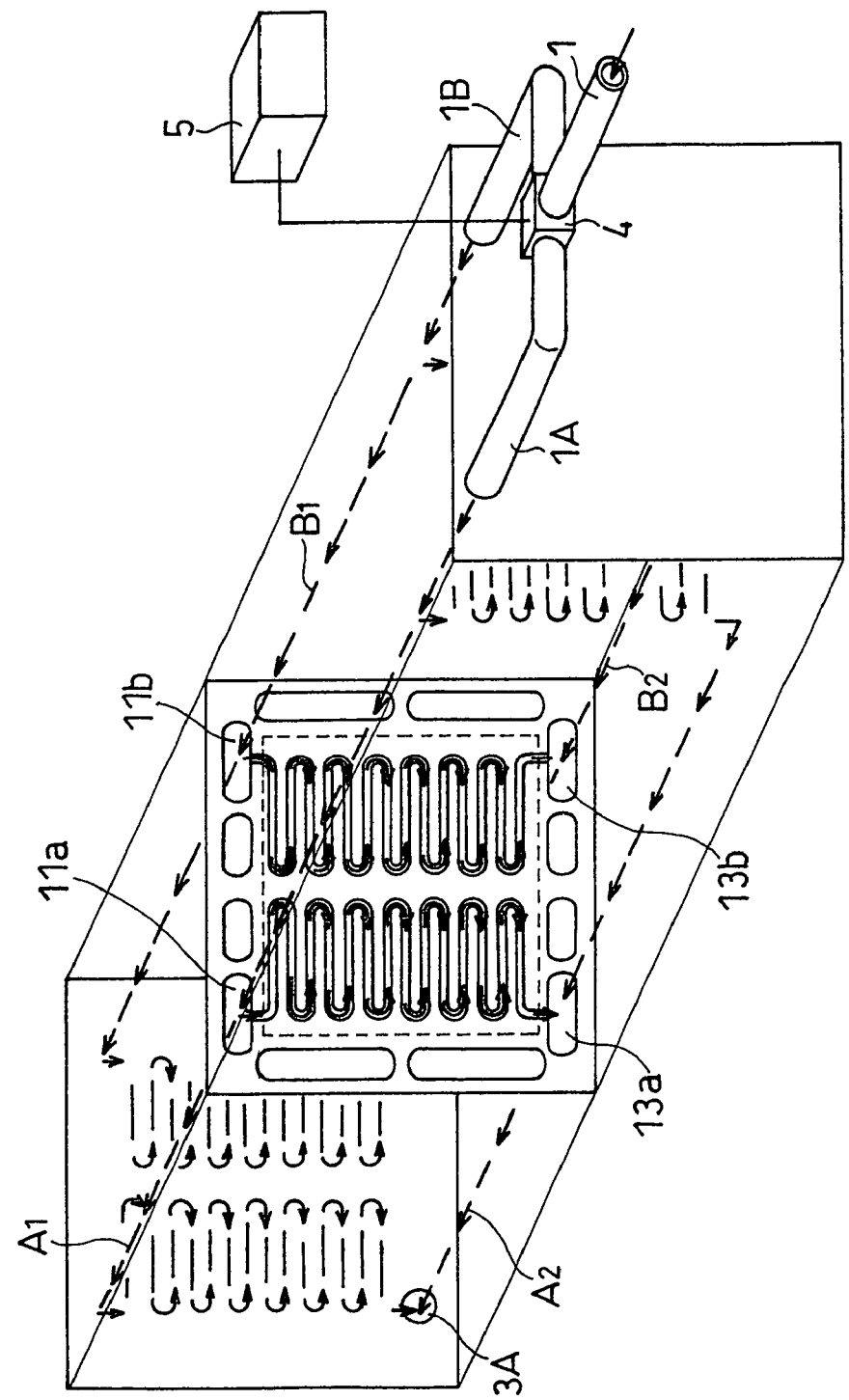
FIG. 4 is a three-dimensional schematic view showing the flow of a fuel gas through the fuel cell in Embodiment 1 of the present invention.

FIG. 4 is a three-dimensional schematic view showing the flow of the fuel gas through the fuel cell. A fuel gas inlet pipe 1 branches into two pipes 1A and 1B at a switching unit 4 that switches between flow routes of the fuel gas. Pipe 1A is connected to the inlet-side manifold aperture 11*a* of separator plate 10, while pipe 1B is connected to the inlet-side manifold aperture 11*b* of separator plate 10. Therefore, the fuel gas supplied to the pipe 1A flows through an inlet-side manifold communicating with pipe 1A as indicated by an arrow A1, while the fuel gas supplied to pipe 1B flows through an inlet-side manifold communicating with pipe 1B as indicated by an arrow B1. From the gas flow route as indicated by arrow A1, the fuel gas flows through gas flow channel 15*a* of the cell's separator plate 10. The unreacted gas and by-products flow through an outlet-side manifold, as indicated by an arrow A2, and are discharged from an outlet pipe 3A. Likewise, from the gas flow route as indicated by arrow B1, the fuel gas flows through gas flow channel 15*b* of the cell's separator plate 10, and the unreacted gas and by-products flow through an outlet-side manifold, as indicated by an arrow B2, and are discharged from an outlet pipe (not shown in the figure). The two pipes connected to the outlet-side manifolds communicate with one outlet pipe at a switching unit in the same manner as inlet pipe 1. Switching unit 4 of inlet pipe 1 and the switching unit of the outlet pipe are controlled by a controller 5, so that the fuel gas is supplied to one or both of the flow routes indicated by arrows A1 and B1 and is discharged from the outlet pipe, depending on the switching of the switching units. In the case where three or more gas flow channels are provided in one face of a separator plate, the inlet pipe branches at the switching unit into a number of pipe branches corresponding to the number of gas flow channels in the separator plate.

Although FIG. 4 shows the flow in the separator plate of only the fuel gas, the flows of the oxidant gas and cooling water are also controlled in the same manner as the fuel gas.

Embodiment 2

This embodiment describes an example of dividing each of the fuel gas flow channel and the oxidant gas flow channel into two parts, such that the area ratio of the flow channel regions of the two divided gas flow channels is 2:1. The flow channel regions in which the independent gas flow channels are located may be different or the same in area (size), as necessary. The term "flow channel region" as used herein refers to the region of a separator plate at which each flow channel is located. The area ratio is based on the areas of the flow channels projected onto the plane of the separator plate. The cross-sections of the different flow channels may be the same or different. If the cross-sections are the same, an area ratio of 2:1 indicates that there is also a length ratio of about 2:1. In any event, the flow channels may have the same or different total volumes, and the same or different total volumes may be provided by varying the cross-section or length of the channels.

Figure 6:
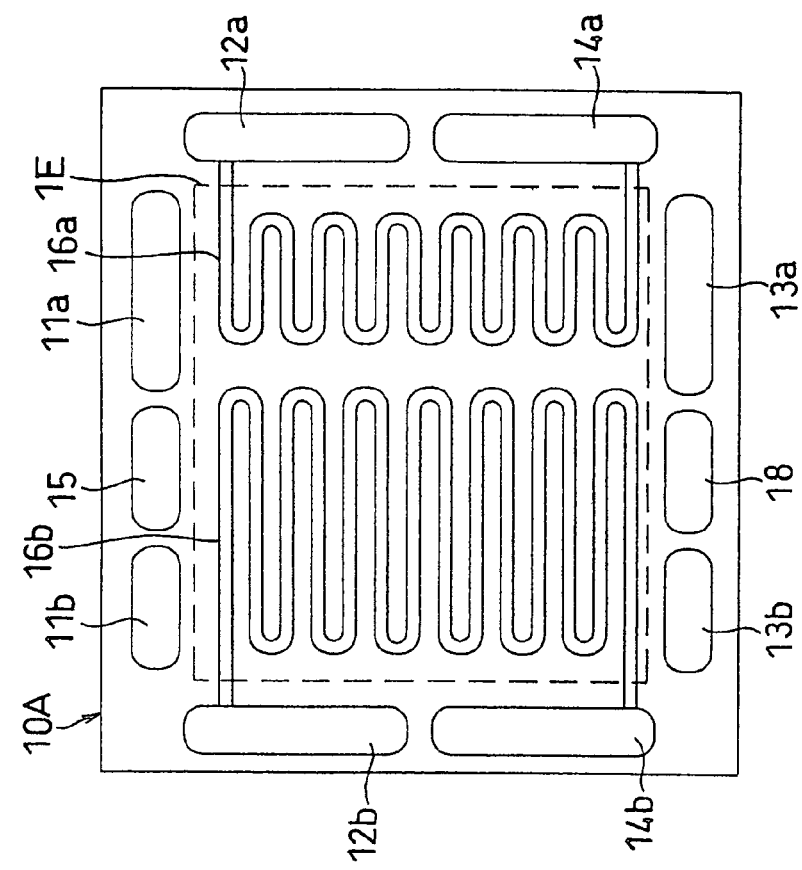
FIG. 6 is a front view of the cathode side of the separator plate of FIG. 5.
Figure 5:
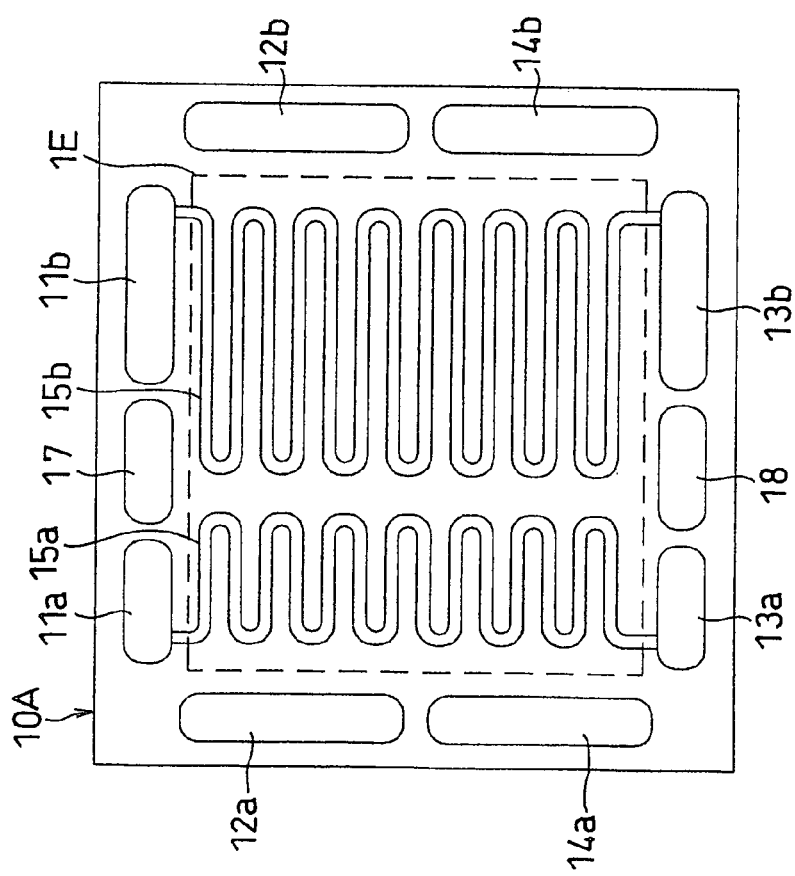
FIG. 5 is a front view of the anode side of a conductive separator plate of a fuel cell in Embodiment 2 of the present invention.

FIG. 5 is a front view of the anode side of a separator plate 10A of this embodiment, and FIG. 6 is a back view thereof as well as a front view of the cathode side. Since the same reference numerals as those of FIGS. 1 and 2 represent the same constituent elements, the explanations thereof are omitted in this embodiment and the following embodiments.

The gas flow channels 15*b* and 16*b* are structured such that the flow rates are twice those of the gas flow channels 15*a* and 16*a*. Thus, the supply pipe and the exhaust pipe for each gas, to be connected to the respective manifold apertures, branch into two branches immediately before/after the inlet/outlet of the fuel cell, and the branched pipes are structured such that the ratio of their cross-sectional areas is 2:1 in agreement with the area ratio of the flow channel regions of the two gas flow channels. Also, an electromagnetic valve is installed in the two branched pipes on both the inlet and outlet sides, and by closing one of the two valves, the gas can be supplied and discharged to and from only one of the two independent gas flow channels. In this embodiment, the cooling water flow channel is illustrated as not being divided into two, but it will be apparent to those skilled in the art that the cooling water flow channel can also be divided, as necessary, in the same manner as the gas flow channels.

Embodiment 3

Figure 8:
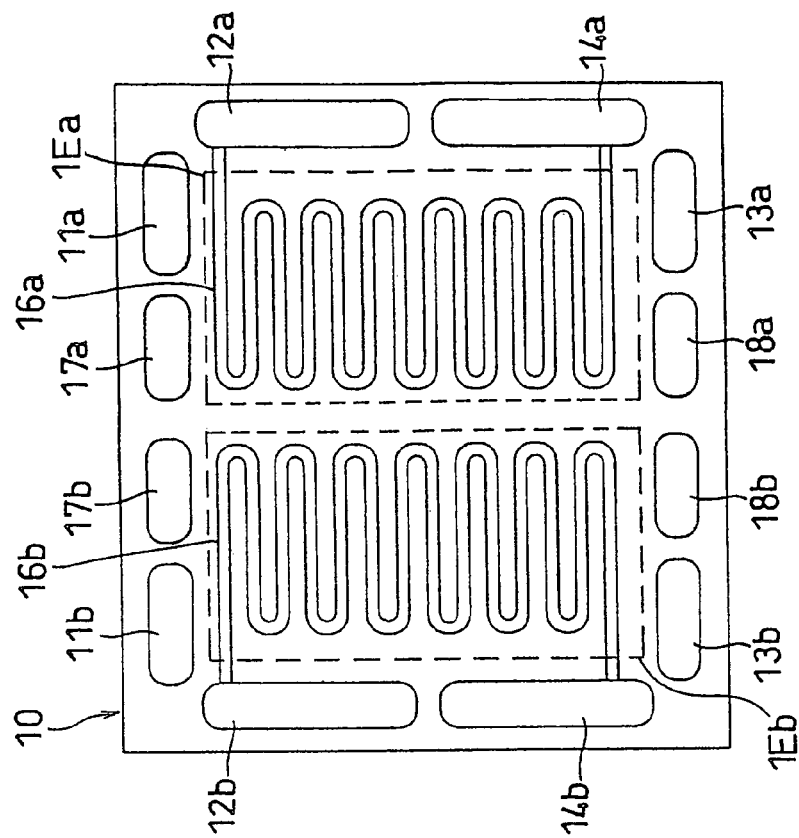
FIG. 8 is a front view of the cathode side of the separator plate of FIG. 7.
Figure 7:
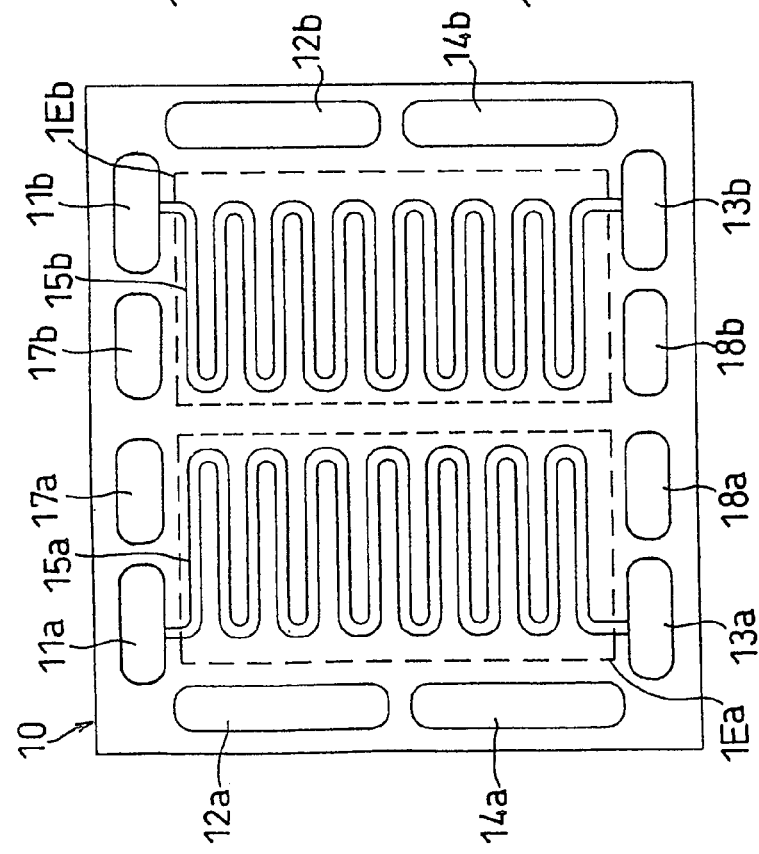
FIG. 7 is a front view of the anode side of a conductive separator plate of a fuel cell in Embodiment 3 of the present invention.

FIGS. 7 and 8 illustrate a separator plate of this embodiment. This is an example of dividing the electrodes of an MEA into two physically separate sections, in correspondence with the two divided gas flow channels. The physical separation between the two electrode sections prevents or diminishes migration of water and reaction gases from one electrode section to the other. The physical separation can be provided by an air gap between the electrode sections or by interposing a water-impermeable material and a reaction gas-impermeable material therebetween. An electrode section 1Ea of the MEA is provided in agreement with the fuel gas flow channel 15a and the oxidant gas flow channel 16a, while an electrode section 1Eb is provided in agreement with the fuel gas flow channel 15b and the oxidant gas flow channel 16b. Except for these electrode sections 1Ea and 1Eb, this embodiment has the same constitution as that of Embodiment 1.

Embodiment 4

Figure 10:
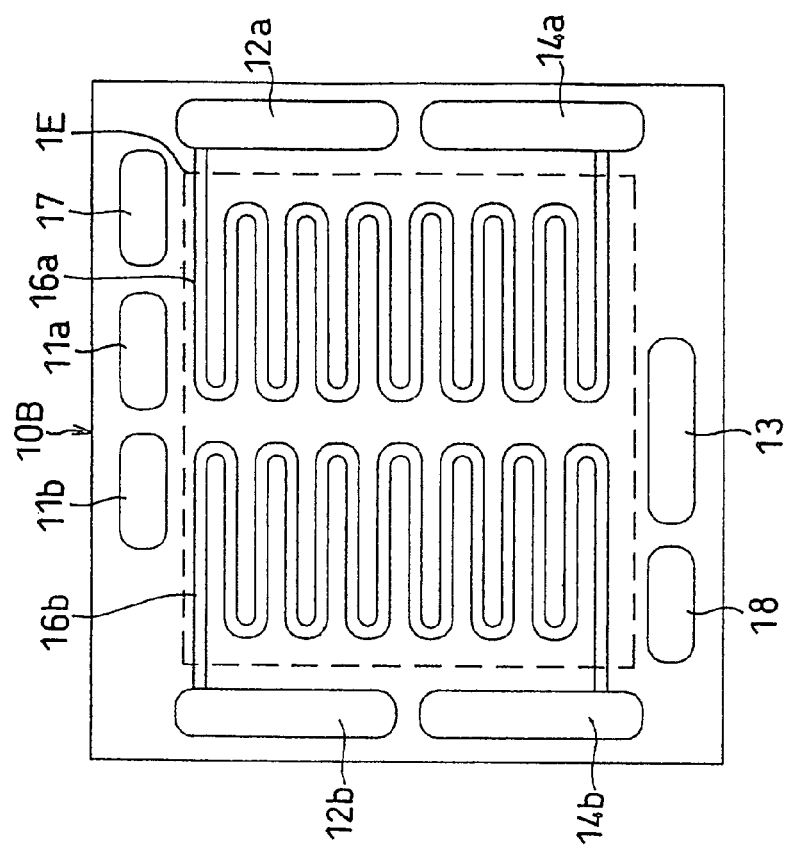
FIG. 10 is a front view of the cathode side of the separator plate of FIG. 9.
Figure 9:
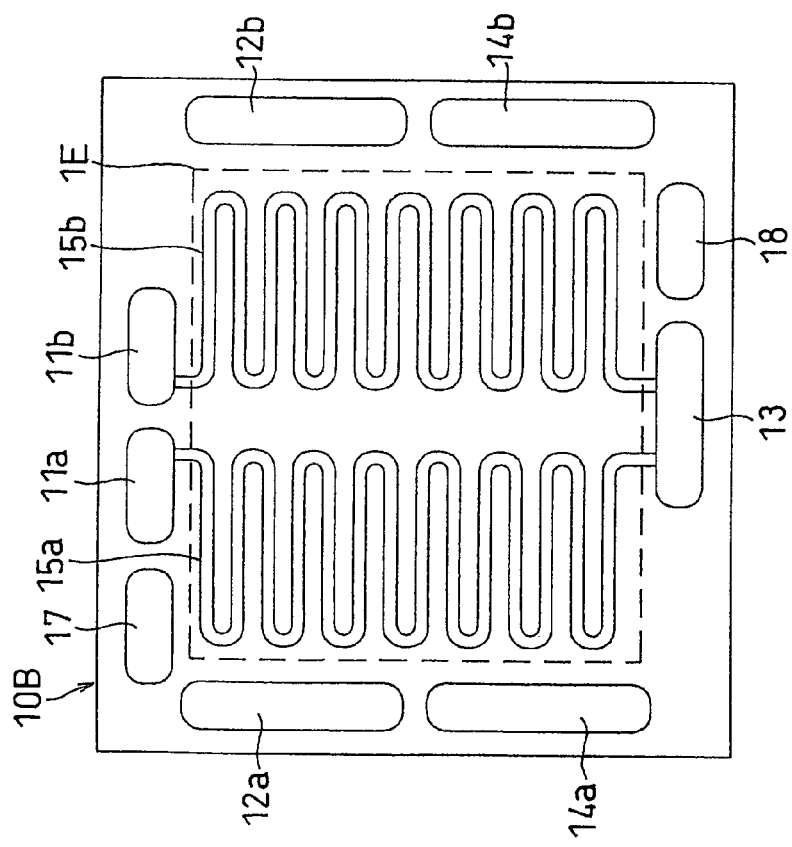
FIG. 9 is a front view of the anode side of a conductive separator plate of a fuel cell in Embodiment 4 of the present invention.

FIGS. 9 and 10 illustrate a separator plate 10B of this embodiment. The fuel gas flow channel and the oxidant gas flow channel are divided into two parts, in the same manner as in Embodiment 1. However, a fuel gas outlet-side manifold aperture 13 is shared by the gas flow channels 15a and 15b.

Embodiment 5

Figure 12:
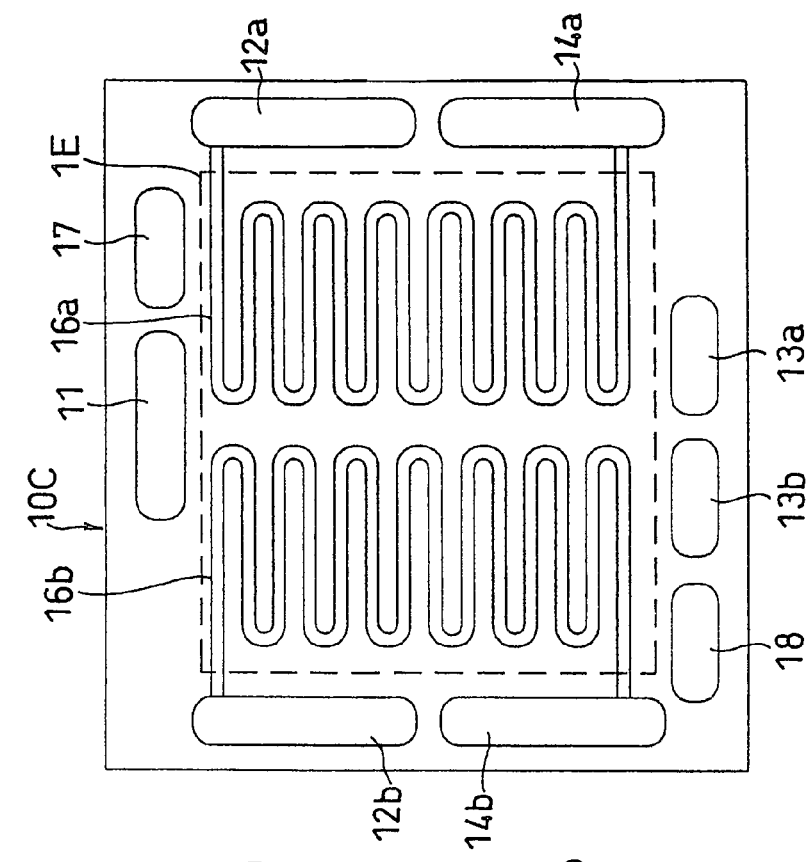
FIG. 12 is a front view of the cathode side of the separator plate of FIG. 11.
Figure 11:
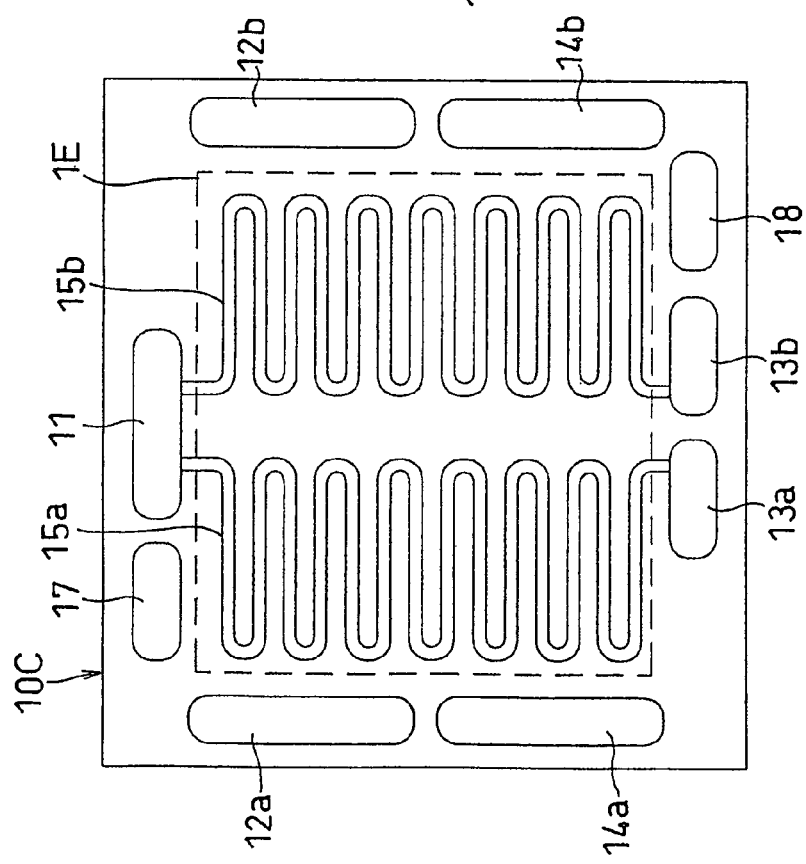
FIG. 11 is a front view of the anode side of a conductive separator plate of a fuel cell in Embodiment 5 of the present invention.

FIGS. 11 and 12 illustrate a separator plate 10C of this embodiment. The fuel gas flow channel and the oxidant gas flow channel are divided into two parts, in the same manner as in Embodiment 1. However, a fuel gas inlet-side manifold aperture 11 is shared by the gas flow channels 15a and 15b.

Embodiment 6

Figure 13:
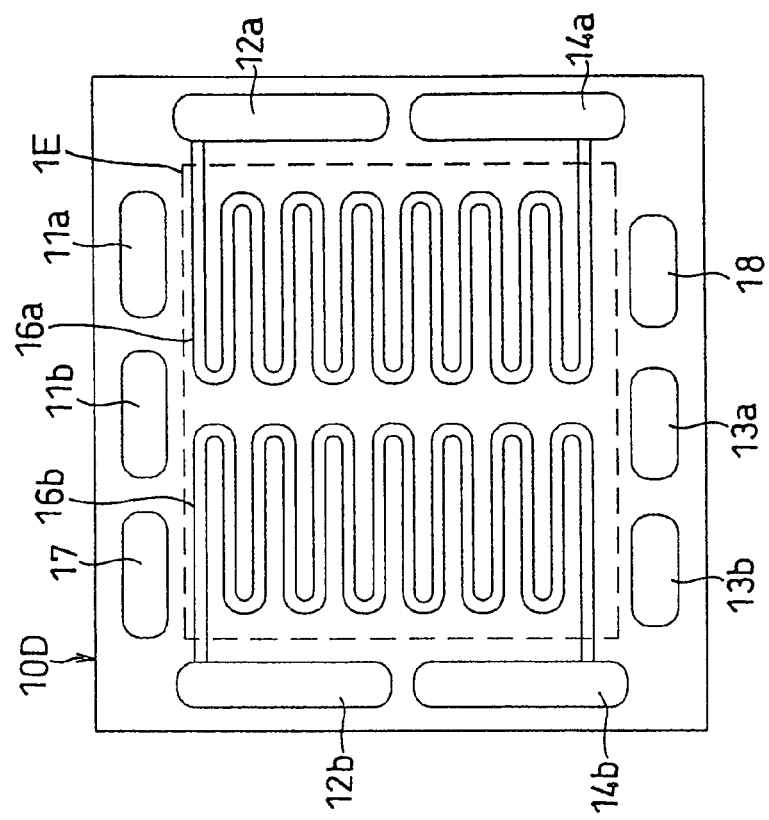
FIG. 13 is a front view of the anode side of a conductive separator plate of a fuel cell in Embodiment 6 of the present invention.
Figure 14:
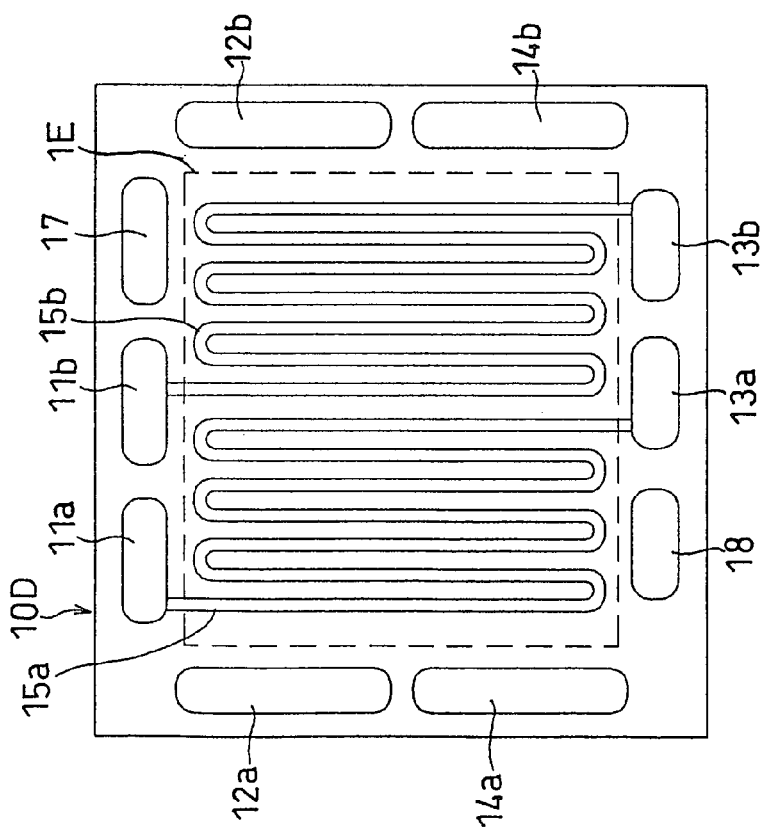
FIG. 14 is a front view of the cathode side of the separator plate of FIG. 13.

FIGS. 13 and 14 illustrate a separator plate 10D of this embodiment. The fuel gas flow channel and the oxidant gas flow channel are divided into two parts, in the same manner as in Embodiment 1. However, the main extent of fuel gas flow channels 15a and 15b are perpendicular to the main extent of oxidant gas flow channels 16a and 16b.

Embodiment 7

Figure 16:
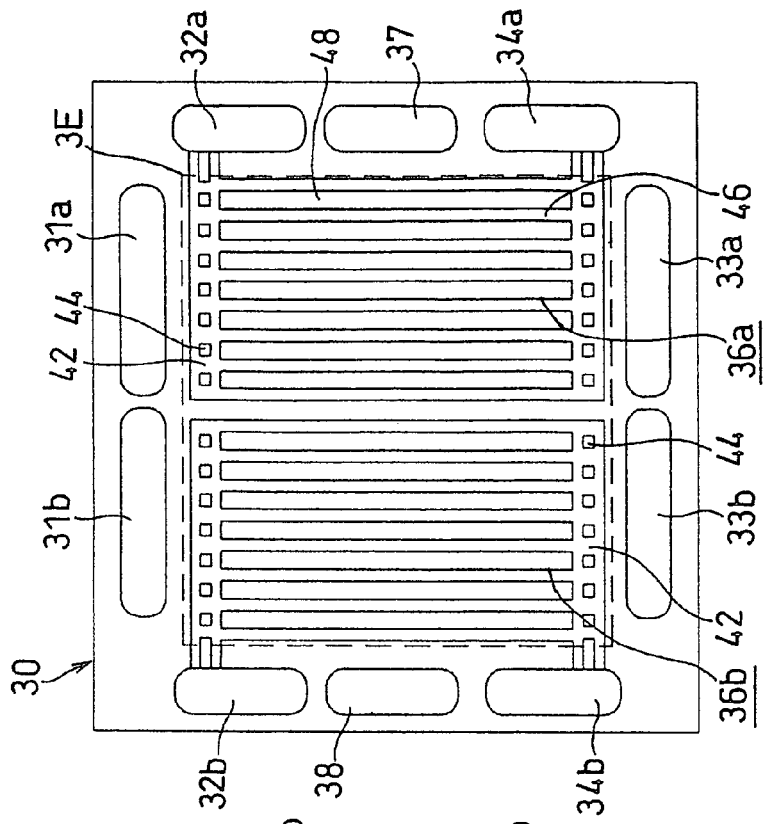
FIG. 16 is a front view of the cathode side of the separator plate of FIG. 15.
Figure 15:
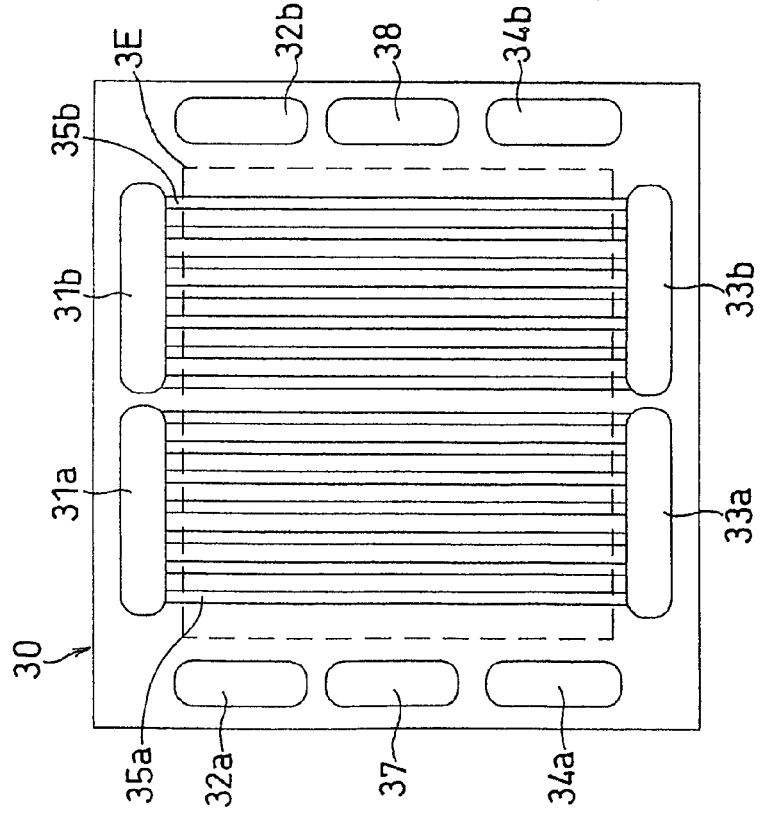
FIG. 15 is a front view of the anode side of a conductive separator plate of a fuel cell in Embodiment 7 of the present invention.

Although the foregoing embodiments have described the separator plates having serpentine-type gas flow channels, this embodiment describes a separator plate having straight-type gas flow channels. FIGS. 15 and 16 illustrate a separator plate of this embodiment.

A separator plate 30 has fuel gas flow channels 35a and 35b on the anode facing side. The fuel gas flow channels 35a and 35b include seven parallel linear grooves that communicate with inlet-side manifold apertures 31a and 31b and outlet-side manifold apertures 33a and 33b, respectively. On the cathode facing side, the separator plate 30 has oxidant gas flow channels 36a and 36b, communicating with inlet-side manifold apertures 32a and 32b and outlet-side manifold apertures 34a and 34b, respectively. The gas flow channels 36a and 36b include linear depressed parts 42 extending from the manifold apertures and linear grooves 46 which are zoned by ribs 48 and communicate with the depressed parts 42. Ribs 44 are provided on the depressed parts 42. Numeral 37 represents a cooling water inlet-side manifold aperture, and numeral 38 represents a cooling water outlet-side manifold aperture. The portion surrounded by a dotted line 3E is the area which the electrode is to contact.

Since both of the gas flow channels are substantially linear, the total length of each gas flow channel becomes short. Thus, the pressure loss of the gas supply and the gas velocity in the rated operation decrease. In order to increase the gas velocity, it is therefore necessary to narrow the groove width of the gas flow channel in comparison with the serpentine-type flow channel.

Embodiment 8

Figure 17:
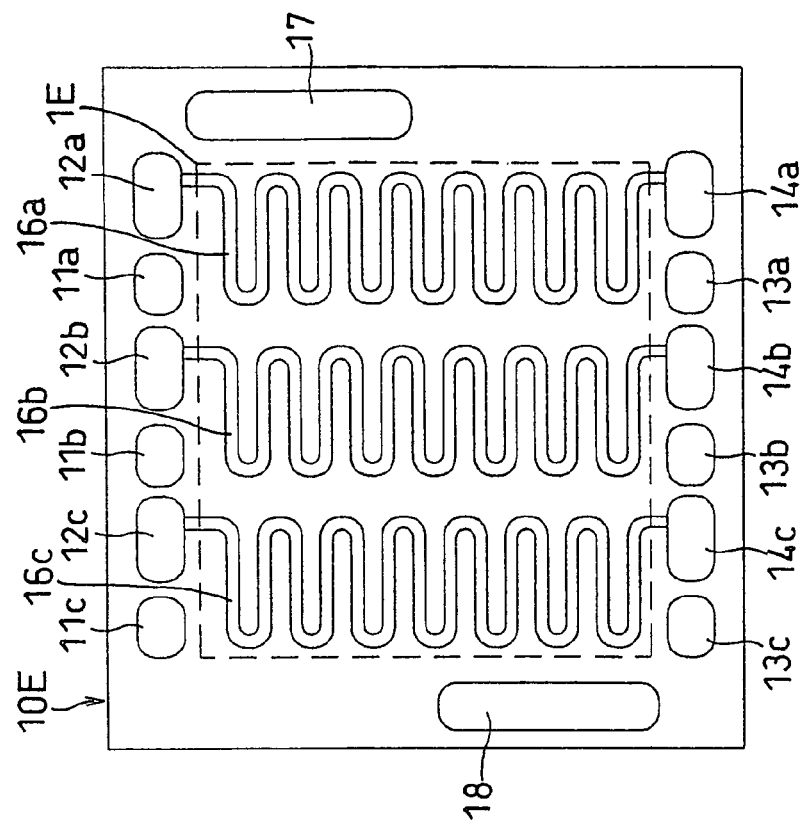
FIG. 17 is a front view of the anode side of a conductive separator plate of a fuel cell in Embodiment 8 of the present invention.
Figure 18:
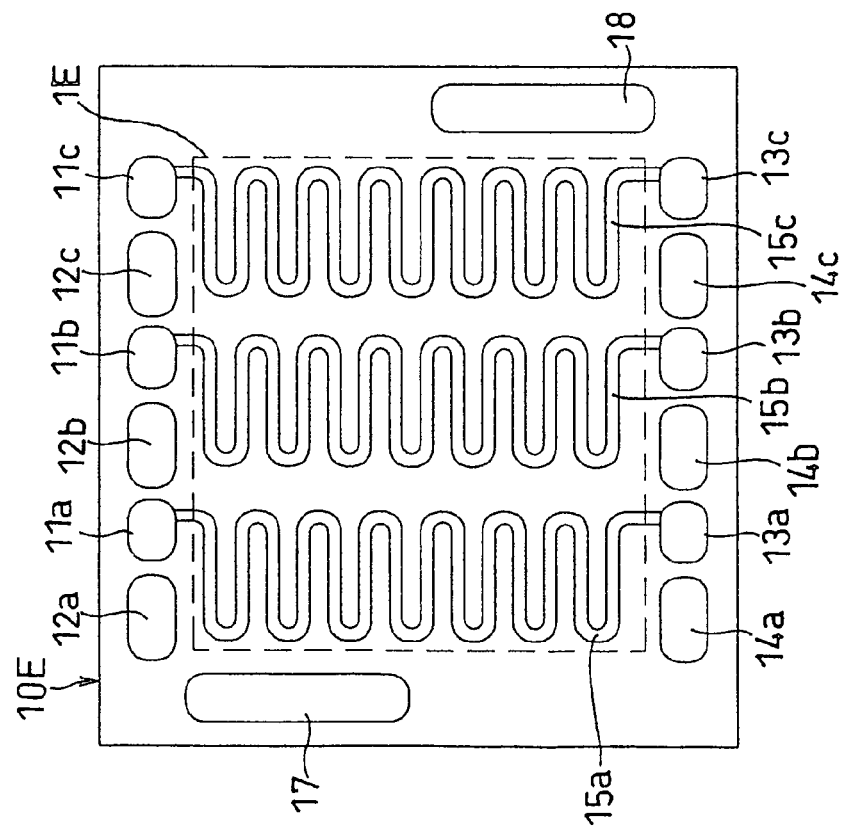
FIG. 18 is a front view of the cathode side of the separator plate of FIG. 17.

This embodiment describes an example of dividing each of the fuel and oxidant gas flow channels of the separator plate into three parts, such that the flow channel regions of the three divided flow channels have an equal area. As illustrated in FIGS. 17 and 18, a separator plate 10E has fuel gas inlet-side manifold apertures 11a, 11b and 11c, fuel gas outlet-side manifold apertures 13a, 13b and 13c, oxidant gas manifold apertures 12a, 12b and 12c, and oxidant gas manifold apertures 14a, 14b and 14c. Thus, the supply pipe and the exhaust pipe for each gas, to be connected to the respective manifold apertures, branch into three parts immediately before/after the inlet/outlet of the fuel cell, and the three branched pipes have the same diameter such that the gas is evenly distributed to the branched pipes. Also, an electromagnetic valve is installed in the three branched pipes on both the inlet and outlet sides, and by closing one or two of the three valves, the gas can be supplied and discharged to and from only one or two of the three divided gas flow channels. It is therefore important that the lengths of the three branched gas pipes are equal in order to equalize the pressure losses in the three gas pipes. It is also important, in terms of even gas distribution, that the lengths of the three divided gas flow channels 15a, 15b and 15c and 16a, 16b and 16c are equal to equalize the pressure losses in the three independent gas flow channels.

Embodiment 9

This embodiment describes an example of dividing each of the fuel and oxidant gas flow channels of the separator plate into four parts, such that the flow channel regions of the four divided flow channels have an equal area. As illustrated in FIGS. 19 and 20, a separator plate 10F has fuel gas inlet-side manifold apertures 11a, 11b, 11c and 11d, fuel gas outlet-side manifold apertures 13a, 13b, 13c and 13d, oxidant gas inlet-side manifold apertures 12a, 12b, 12c and 12d, and oxidant gas outlet-side manifold apertures 14a, 14b, 14c and 14d. In the same manner as in Embodiment 8, the supply pipe and the exhaust pipe for each gas, to be connected to the respective manifold apertures, branch into four parts immediately before/after the inlet/outlet of the fuel cell, and the four branched pipes have the same diameter such that the gas is evenly distributed to the branched pipes. Also, an electromagnetic valve is installed in the four branched pipes on both the inlet and outlet sides, and by closing one, two or three of the four valves, the gas can be supplied and discharged to and from only three, two or one of the four divided gas flow channels. Also, in the same manner as in Embodiment 8, care is taken to ensure that the gas is evenly distributed to the four independent gas flow channels.

Embodiment 10

Figure 21:
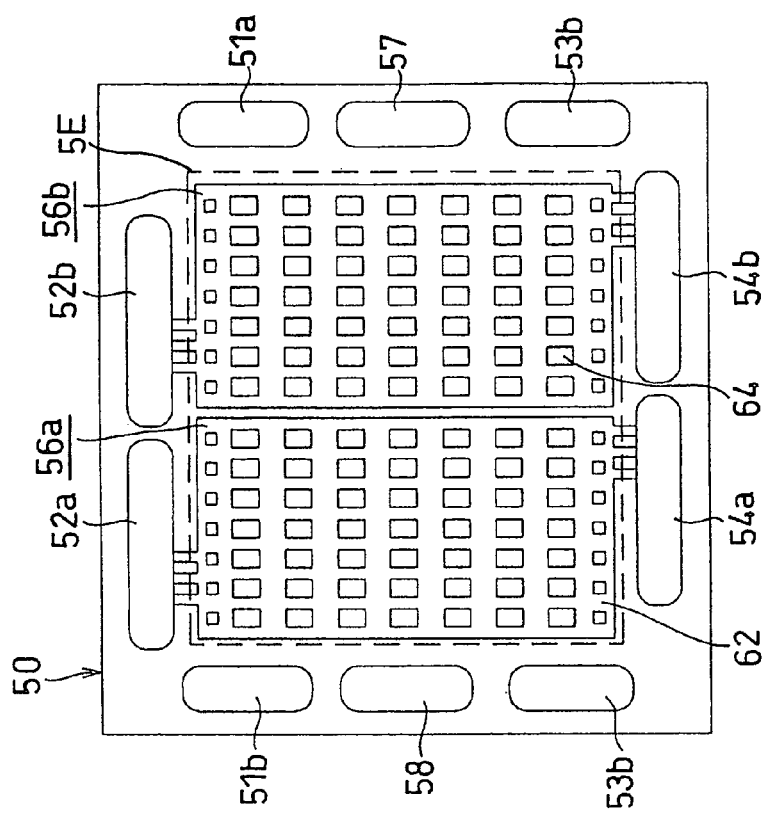
FIG. 21 is a front view of the anode side of a conductive separator plate of a fuel cell in Embodiment 10 of the present invention.
Figure 22:
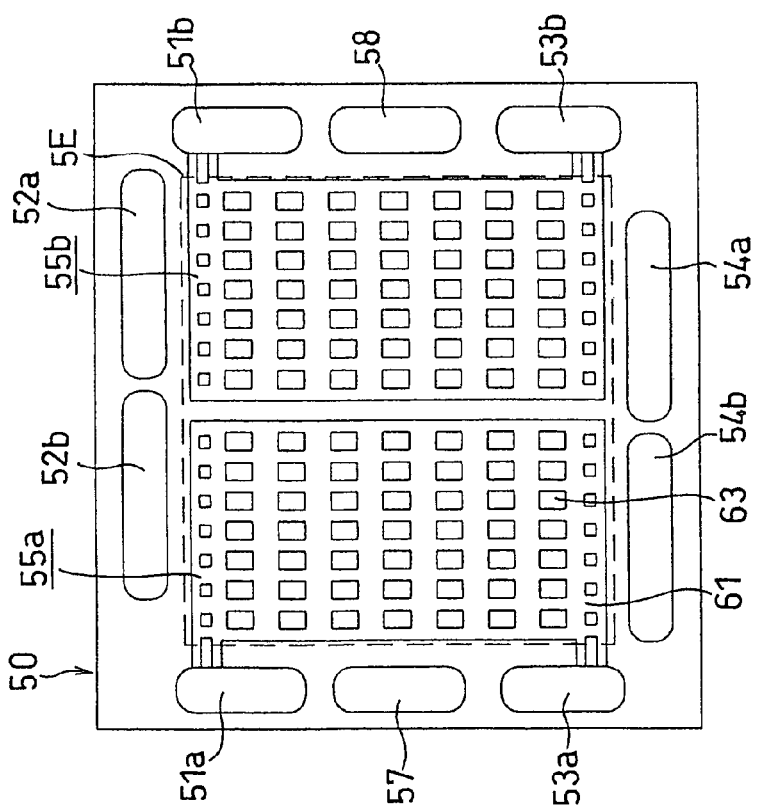
FIG. 22 is a front view of the cathode side of the separator plate of FIG. 21.

FIGS. 21 and 22 illustrate a separator plate of this embodiment. A separator plate 50 has, on the anode facing side, a fuel gas flow channel 55a communicating with an inlet-side manifold aperture 51a and an outlet-side manifold aperture 53a and a fuel gas flow channel 55b communicating with an inlet-side manifold aperture 51b and an outlet side manifold aperture 53b. On the cathode facing side, the separator plate 50 has an oxidant gas flow channel 56a communicating with an inlet-side manifold aperture 52a and an outlet side manifold aperture 54a and an oxidant gas flow channel 56b communicating with an inlet-side manifold aperture 52b and an outlet side manifold aperture 54b. The gas flow channels 55a and 55b include a depressed part 61 having a large number of ribs 63. Likewise, the gas flow channels 56a and 56b include a depressed part 62 having a large number of ribs 64. Numeral 57 represents a cooling water inlet-side manifold aperture, and numeral 58 represents a cooling water outlet-side manifold aperture. The portion surrounded by a dotted line 5E is the area that the electrode is to contact.

Since the fuel gas flow channel and the oxidant gas flow channel include a depressed part having a large number of ribs, the total length of each gas flow channel becomes short. Thus, the pressure loss of the gas supply and the gas velocity in the rated operation decrease. It is therefore desirable to form ribs 63 and 64 on the gas flow channels of the separator plate such that the gas velocity is the same as that of Embodiment 1.

Embodiment 11

Figure 23:
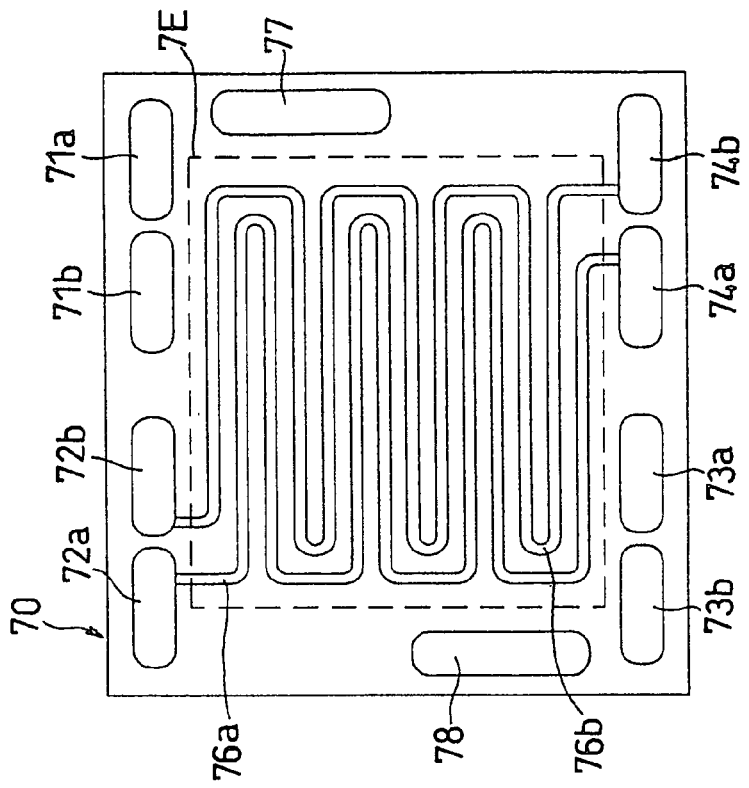
FIG. 23 is a front view of the anode side of a conductive separator plate of a fuel cell in Embodiment 11 of the present invention.
Figure 24:
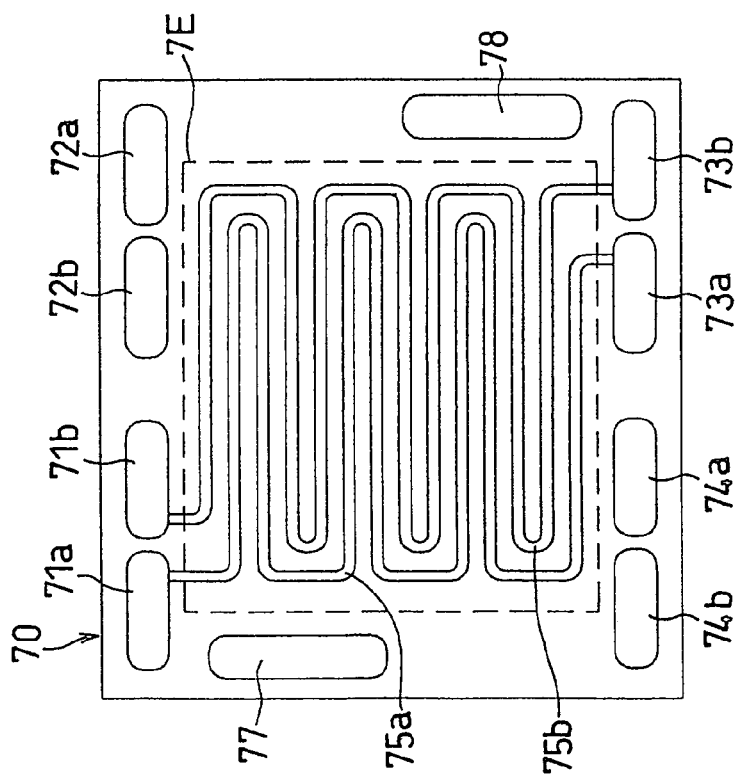
FIG. 24 is a front view of the cathode side of the separator plate of FIG. 23.

FIGS. 23 and 24 illustrate a separator plate of this embodiment. A separator plate 70 has, on the anode-facing side, a fuel gas flow channel 75a communicating with an inlet-side manifold aperture 71a and an outlet-side manifold aperture 73a and a fuel gas flow channel 75b communicating with an inlet-side manifold aperture 71b and an outlet-side manifold aperture 73b. On the cathode facing side, the separator plate 70 has an oxidant gas flow channel 76a communicating with an inlet-side manifold aperture 72a and an outlet-side manifold aperture 74a and an oxidant gas flow channel 76b communicating with an inlet-side manifold aperture 72b and an outlet-side manifold aperture 74b. Each pair of the gas flow channels 75a and 75b and the gas flow channels 76a and 76b are interdigitated and parallel to each other and of the serpentine type. That is, instead of the structure of dividing the area of the separator plate contacting the electrode into two, these flow channels have a structure that the adjacent flow channels in the same area are independent of each other. Numeral 77 represents a cooling water inlet-side manifold aperture, and numeral 78 represents a cooling water outlet-side manifold aperture. The portion surrounded by a dotted line 7E is the area that the electrode is to contact.

Examples of the present invention are described below.

EXAMPLE 1

A cathode-side catalyst was prepared by placing 25% by weight of platinum particles, having an average particle size of approximately 30 Angstroms (Å), on an acetylene black carbon powder. An anode-side catalyst was prepared by placing 25% by weight of platinum-ruthenium alloy particles, having an average particle size of approximately 30 Å, on an acetylene black carbon powder. A dispersion of each of these catalysts in isopropanol was mixed with a dispersion of perfluorocarbon sulfonic acid powder in ethyl alcohol to form a paste-like ink. The ink was applied by screen printing onto one side of a 250 micron (μm) thick carbon fiber nonwoven fabric. In this way, a cathode-side catalyst layer and an anode-side catalyst layer were formed. In each of the catalyst layers, the content of catalyst metal was 0.3 milligrams/square centimeter (mg/cm$^2$), and the content of perfluorocarbon sulfonic acid was 1.2 mg/cm$^2$.

A pair of electrodes, which were the carbon fiber nonwoven fabrics having these catalyst layers, were bonded by hot pressing to both sides of the center part of a hydrogen-ion conductive polymer electrolyte membrane, having a slightly larger area than the electrodes, in such a manner that the catalyst layers were bonded to the electrolyte membrane. A gasket prepared by cutting a 250 μm thick fluorocarbon rubber sheet into a predetermined size was fitted and hot pressed to the exposed peripheral part of the electrolyte membrane, to produce an electrolyte membrane electrode assembly (MEA). The hydrogen-ion conductive polymer electrolyte was a thin film of perfluorocarbon sulfonic acid of 30 μm thickness.

The conductive separator plates of Embodiment 1 were used. These separator plates had gas flow channels and manifold apertures that were formed by machining an isotropic graphite material of 3 millimeters (mm) in thickness. The gas flow channels had a channel width of 2 mm and a depth of 1 mm, and the width of the rib between the channels was 1 mm.

The MEAs and the separator plates were alternately stacked to form a cell stack of 50 cells. As explained in Embodiment 1, the combination separator plate having a cooling section was inserted every two cells. A current collector plate, which is a gold-plated copper plate, and an insulator plate, made of polyphenylene sulfide (PPS), were joined to each end of the cell stack. The resultant cell stack was sandwiched between stainless steel end plates and clamped with clamping rods. The clamping pressure was 10 kilogram-feet/square centimeter (kgf/cm$^2$) per electrode area. The resultant fuel cell was installed such that the separator plates stood in a vertical direction.

While this fuel cell was retained at 70° C., a fuel gas humidified and heated to have a dew point of 70° C. was supplied to the anode and air humidified and heated to have a dew point of 70° C. was supplied to the cathode. The fuel gas was composed of 80% hydrogen gas, 20% carbon dioxide, and 10 parts per million (ppm) carbon monoxide. The rated operating conditions of this fuel cell were: 75% fuel utilization; 40% oxygen utilization; and 0.3 amps/square centimeter (A/cm$^2$) current density.

Figure 27:
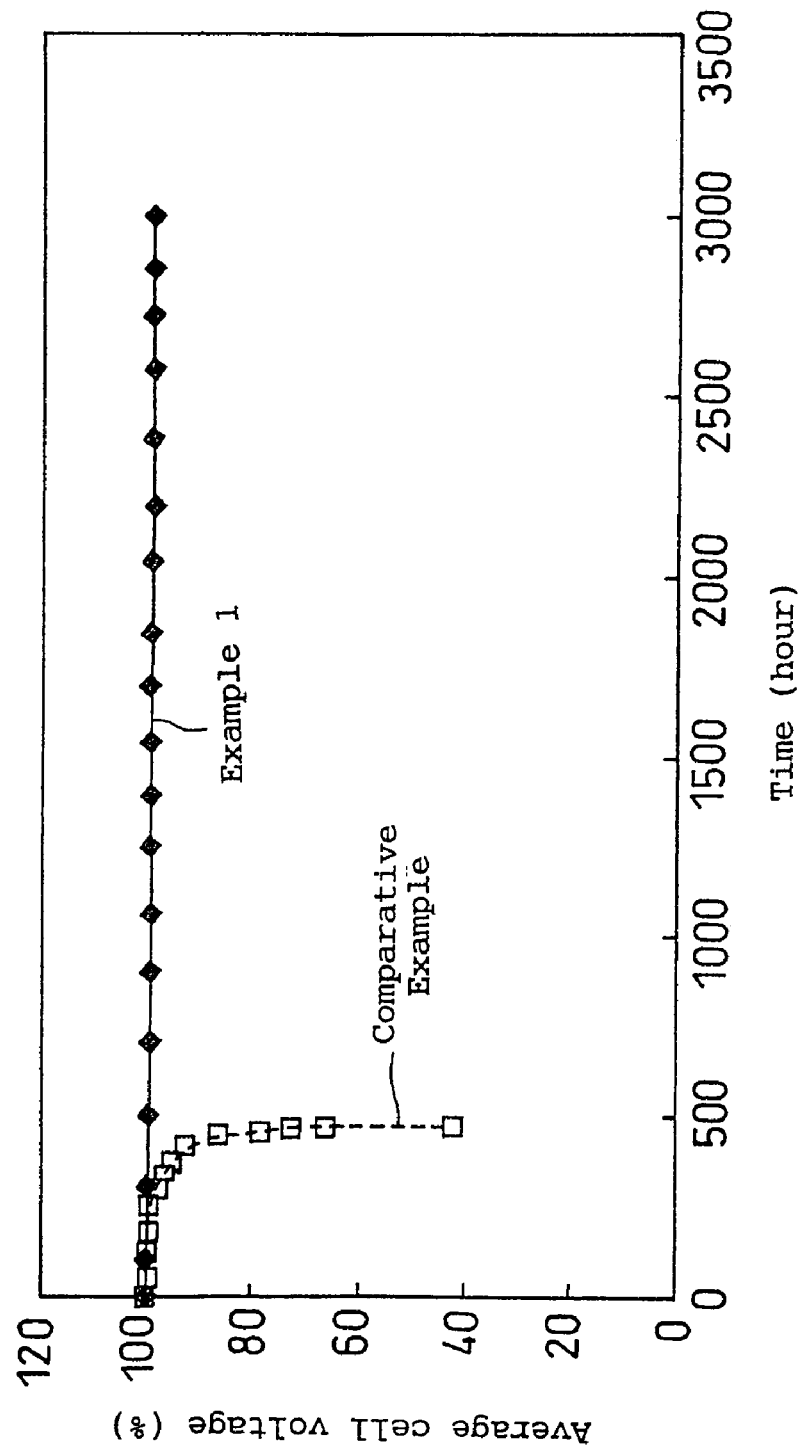
FIG. 27 is a graph showing changes with time in average cell voltage of fuel cells of Example 1 and the Comparative Example.

This fuel cell was subjected to a low load endurance test at a current density of 0.15 A/cm$^2$, which was 50% of the rated load, at the same gas utilization rates as those of the rating. In this example, by operating the electromagnetic valves installed in the two branched pipes on the inlet and outlet sides, each gas was supplied to only one of the two divided gas flow channels at a predetermined flow rate. At this time, the gas flow channel to which the fuel gas was supplied and the gas flow channel to which the oxidant gas was supplied were located on the same side. The gas flow channel to which the gas was supplied was switched at a rate of once per hour to avoid not supplying the gas to a particular gas flow channel for a long period of time. FIG. 27 shows a change with time in average cell voltage of the fuel cell of this example. The cell voltage is expressed by defining the voltage at the initial stage as 100%.

The fuel cell of this example retained stable cell characteristics and remained unchanged from the initial stage even after the lapse of 3,000 hours. From this result, it has been confirmed that during a low load operation of the fuel cell, no deterioration occurs since the electrode portion to which the gas is not supplied and in which little power is generated is maintained at the same potential as that of the power-generating portion. It has also been confirmed that in the low load operation of the fuel cell of this example, the electrode portion to which the gas is not intended to be supplied by the inlet manifold receives a very small amount of gas due to the underflow of the gas through the gas diffusion layer and that this electrode portion generates some electric power.

Then, after the lapse of 3,000 hours, each gas was supplied to only one of the two divided gas flow channels for another 1000 hours at the predetermined flow rate, without switching between the gas flow channels, to perform a power generation test. During this test, the cell performance was maintained. Thereafter, with the load changed back to the rated condition (0.3 A/cm$^2$), each gas was supplied to both of the two divided gas flow channels. In this case, after having been lowered, the cell performance gradually recovered and exhibited the initial rated power generation performance, but this recovery took about one day. That is, since one of the two divided gas flow channels was not supplied with the gas for a long period of time, this one of the gas flow channels became clogged with condensed water and took about one day to fully return to its original unclogged state after the gas supply was resumed. Therefore, when the operation was switched from the low load operation to the rated operation, the region of the gas flow channel clogged with the condensed water was unable to generate power, because the immediate supply of the gas to the region was not possible.

These results indicate that by alternately switching between the gas supply regions at regular time intervals, to exhaust the condensed water stagnating in the gas flow channel, it is possible to smooth the effects of change of load when switching between the gas flow channels.

Figure 28:
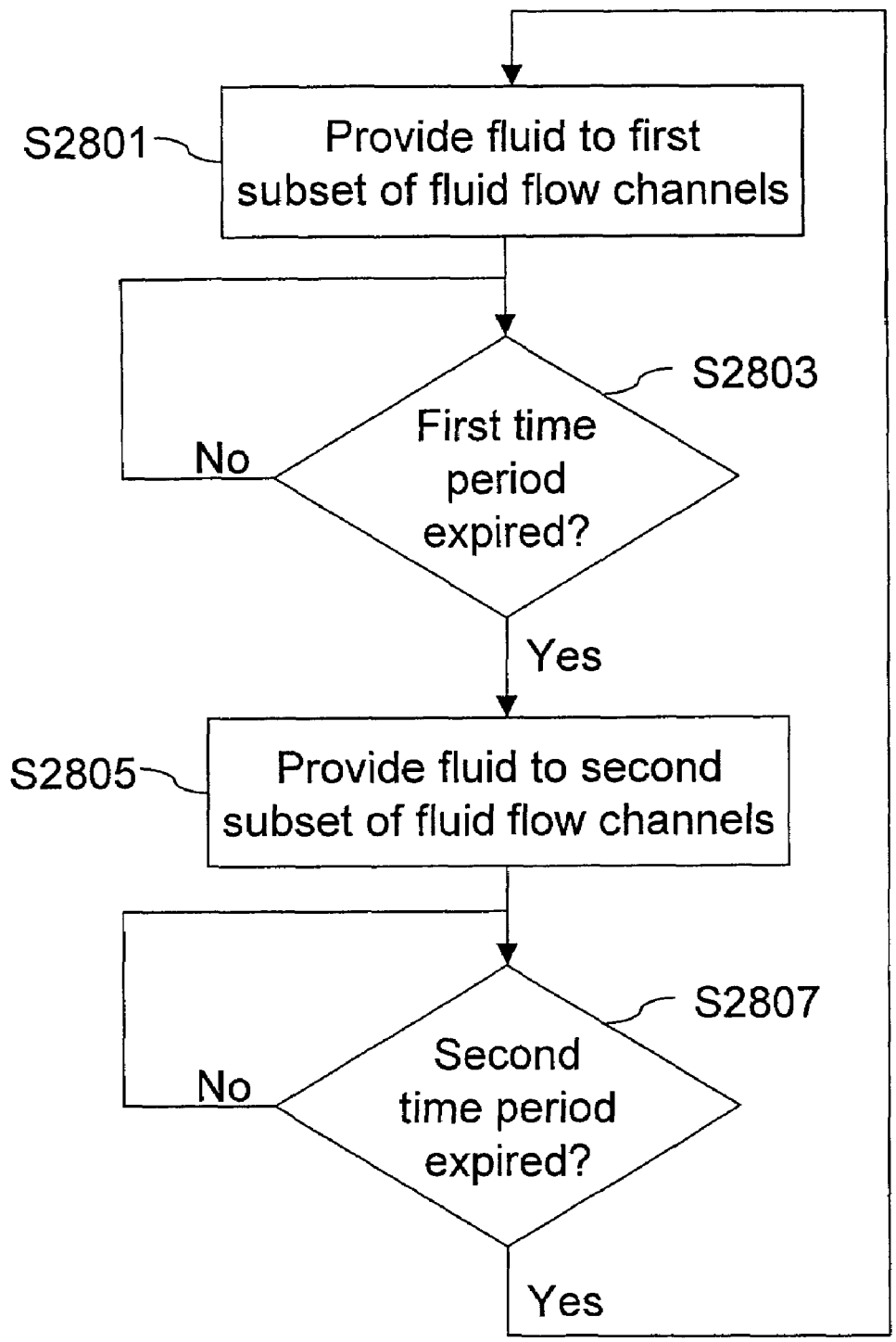
FIG. 28 illustrates a method of operating a fuel cell in accordance with the invention.

FIG. 28 illustrates a method of operating a fuel cell as described above. According to this method, fluid is provided in Step S2801 to a first subset of a plurality of independent fluid flow channels formed in a face of a separator plate, which is used in the fuel cell. In practice, this method may be applied to both the cathode and anode of a unit cell within a fuel cell stack, or it may be applied to only one of the cathode and anode electrodes of the unit cell. Additionally, the fluid may be a coolant, a fuel gas, or an oxidant gas provided to the separator plate. After a first time period expires in Step S2803, the supply of fluid to the first subset of fluid flow channels is discontinued and is instead provided in Step S2805 to a second subset of the independent fluid flow channels. Similarly, when a second time period expires in Step S2807, the supply of fluid to the second subset of fluid flow channels is discontinued and provided in Step S2801 to the first subset of the independent fluid flow channels. This process may be repeated as many times as desired for first and second time periods that may or may not be the same and that may vary with time.

COMPARATIVE EXAMPLE

Figure 25:
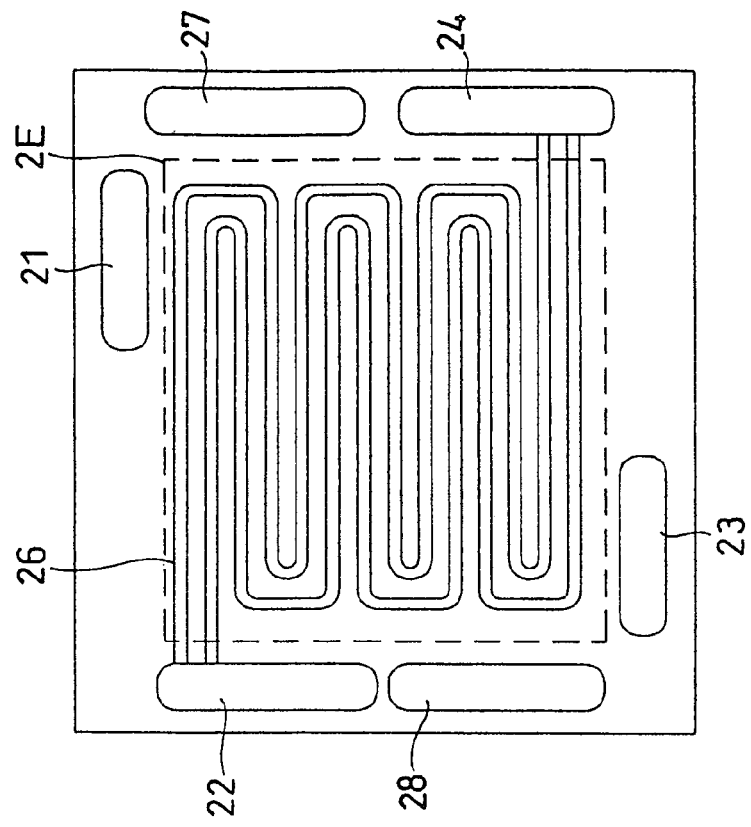
FIG. 25 is a front view of the anode side of a conductive separator plate of a fuel cell in a Comparative Example.
Figure 26:
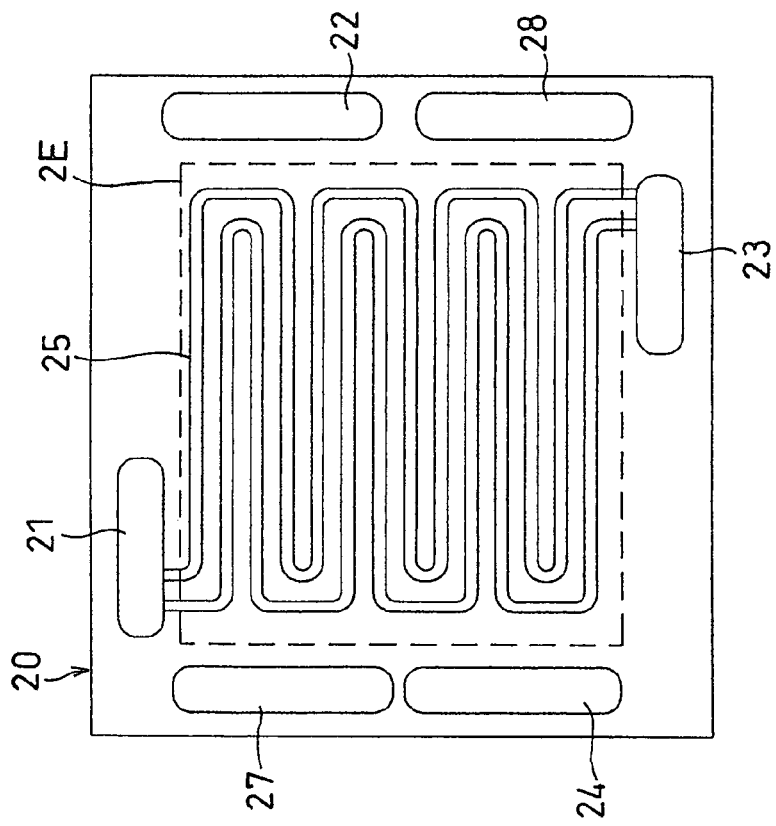
FIG. 26 is a front view of the cathode side of the separator plate of FIG. 25.

FIGS. 25 and 26 illustrate a conductive separator plate of a fuel cell of this comparative example. A separator plate 20 has, on the anode facing side, two parallel flow channels 25 for a fuel gas communicating with an inlet-side manifold aperture 21 and an outlet-side manifold aperture 23. On the cathode facing side, the separator plate 20 has two parallel flow channels 26 for an oxidant gas communicating with an inlet-side manifold aperture 22 and an outlet-side manifold aperture 24. Numeral 27 represents a cooling water inlet-side manifold aperture, and numeral 28 represents a cooling water outlet-side manifold aperture. The portion surrounded by a dotted line 2E is the area that the electrode is to contact. These gas flow channels had a channel width of 2 mm and a depth of 1 mm, and the width of the rib between the channels was 1 mm. The cooling water flow channel of a separator plate for forming a cooling section was not divided just like these gas flow channels. In the same manner as in Example 1, except for these identified differences, a fuel cell was assembled.

While the fuel cell of this comparative example was retained at 70° C., the fuel gas and air were supplied under the same conditions as those of Example 1. This fuel cell was subjected to a low load endurance test at a current density of 0.15 A/cm$^2$, which was 50% of the rated load. The gas utilization rates were the same as those of the rating, and the gas flow rates were reduced to half. FIG. 27 shows a change with time in average cell voltage of this fuel cell.

Although the fuel cell of Example 1 retained stable cell performance without any change from the initial stage even after the lapse of 3,000 hours, the fuel cell of this Comparative Example suddenly exhibited a voltage drop upon the passage of 500 hours, so that the output power could not be maintained.

The reason is as follows. In the 50% low load operation of the fuel cell of Example 1, the gas supply area was reduced to half that of the rated operation, so the gas velocity in the gas flow channel was successfully maintained constant even at the same gas utilization rates as those of the rating. By contrast, the fuel cell of the Comparative Example used the same gas flow channels and gas utilization rates as those of the rated operation, but for a 50% low load operation. As a result, the gas velocity in the gas flow channel decreased to half that used for the rated power generation. As a result, in the Comparative Example, under the operating conditions of high humidification where the gases were supplied with a relative humidity of 100%, it was difficult to exhaust the condensed water and the generated water. The water that gradually accumulated in the gas flow channels and the gas diffusion layers blocked the supply of the gases to the reaction sites, thereby resulting in a rapid drop in cell performance.

Thereafter, these fuel cells subjected to the above endurance tests were operated under the rated conditions. As a result, the voltage of the fuel cell of the Comparative Example lowered to 80% or less of the initial voltage. In contrast, the fuel cell of Example 1 retained the cell performance equivalent to that at the initial stage even after the lapse of 3,000 hours.

EXAMPLE 2

A fuel cell was produced in the same manner as in Example 1 except for the use of the separator plates as described in Embodiment 2.

This fuel cell was operated under the same rated conditions as those of Example 1 and at low loads of 33% and 66% of the rating. In the rated operation, each gas was supplied to both of the two divided gas flow channels of the separator plate, and an endurance test of 10,000 hours was performed by supplying the gas at the rated flow rate. In the 33% low load operation, each gas was supplied to only the gas flow channel having a smaller division ratio, i.e., the gas flow channels 15$a$ and 16$a$, and an endurance test of 10,000 hours was performed by supplying the gas at a flow rate of 33% of the rating. Also, in the 66% low load operation, each gas was supplied to only the gas flow channel having a larger division ratio, i.e., the gas flow channels 15$b$ and 16$b$, and an endurance test of 10,000 hours was performed by supplying the gas at a flow rate of 66% of the rating. As a result, it has been confirmed that in all of these tests, stable cell performance was maintained with the voltage drop ratio, after the passage of 10,000 hours, being approximately 2% with respect to the initial voltage. Therefore, it has been found that various operating conditions are possible by arbitrarily changing the area ratio of the divided gas flow channels and combining the gas supply regions according to the ratio of the load.

EXAMPLE 3

In this example, a fuel cell was produced having an MEA in which the catalyst layer and the gas diffusion layer were also divided in agreement with the divided gas flow channel regions, as in Embodiment 3. Except for this, the fuel cell had the same constitution as that of Example 1.

This fuel cell was subjected to a 50% low load operation endurance test by operating the fuel cell at half the rated load under the same operating conditions as those of Example 1 and limiting the gas supply region in the same manner. As a result, identical results to those of Example 1 were obtained. In the fuel cell of Example 1, each reactive gas was distributed by underflow through the gas diffusion layer to the gas flow channel to which the gas was not intended to be supplied by the input manifold, causing this gas flow channel to become clogged with the condensation of the water content of the distributed gas. However, in the fuel cell including the MEA of this example, because of the division of the gas diffusion layer, such underflow of the gas through the gas diffusion layer did not take place. The gas flow channel to which the gas was not supplied was not observed to be clogged after the endurance test, and it was possible to change the load smoothly. Therefore, there is no need to alternately switch between the gas supply regions in order to eliminate gas clogging, which is effective for simplification of the operating algorithm of the system loaded with this fuel cell.

EXAMPLE 4

In this example, a fuel cell was produced in which only the anode side of the separator plate had two independent gas flow channels, as illustrated in Embodiment 1. The cathode side of the separator plate had an undivided gas flow channel as illustrated in FIG. 26. The width of the cathode-side gas flow channel was changed to 1 mm such that the gas velocity in the rated operation would become twice the gas velocity in the cathode-side separator plate of the Comparative Example, in order to retain sufficient gas velocity for preventing the clogging of the gas flow channel with the condensed water and generated water in a low load operation. Except for these differences, a fuel cell was produced in the same manner as in Example 1. Since the cathode-side gas flow channel was not divided, one gas pipe was used to supply the gas to the cathode.

This fuel cell was operated under the same operating conditions as those of Example 1. The fuel gas was supplied to a limited gas supply region at half the flow rate of the rated operation, in the same manner as in Example 1. Air was supplied to the whole region of the gas flow channel, but the flow rate of the air was reduced to half that of the rated operation. In this way, a 50% low load operation endurance test was performed at half the rated load. As a result, the same results as those of Example 1 were obtained. However, when the operation was thereafter changed back to the rated load operation, the cell characteristics were equivalent to those of Example 1, but the pressure loss on the cathode side was twice or more than that of Example 1, because the separator plate was designed such that the air velocity would double.

Thereafter, a fuel cell in which only the cathode-side gas flow channel was divided and the anode-side gas flow channel was not divided was examined for its low load operation characteristics in the same manner. As a result, equivalent results were obtained in terms of both characteristics and endurance, but the pressure loss on the anode side in the rated load operation became large.

EXAMPLE 5

A fuel cell was produced using the separator plates of Embodiment 4. Since these separator plates had one outlet-side fuel gas manifold aperture, the outlet-side fuel gas pipe was composed of one pipe.

This fuel cell was subjected to a 50% low load operation endurance test by operating the fuel cell at half the rated load, under the same operating conditions as those of Example 1, and supplying each gas to a limited gas supply region on both the anode side and the cathode side at half the flow rate of the rated operation.

As a result, the same results as those of Example 1 were obtained. Thereafter, a fuel cell was produced using separator plates each having one common outlet-side oxidant gas manifold aperture. The results were also the same.

EXAMPLE 6

A fuel cell was produced using the separator plates of Embodiment 5. Since these separator plates had one inlet-side fuel gas manifold aperture, the inlet-side fuel gas pipe was composed of one pipe.

This fuel cell was subjected to a 50% low load operation endurance test by operating the fuel cell at half the rated load, under the same operating conditions as those of Example 1, and supplying each gas to a limited gas supply area on both the anode side and the cathode side at half the flow rate of the rated operation. As a result, the same results as those of Example 1 were obtained. Thereafter, a fuel cell was produced using separator plates each having one common inlet-side oxidant gas manifold aperture. The results were also the same.

EXAMPLE 7

A fuel cell was produced in the same manner as in Example 1 except for the use of the separator plates of Embodiment 6. While the fuel cell of this example was maintained at 70° C., a fuel gas (80% hydrogen gas, 20% carbon dioxide, and 10 ppm carbon monoxide) humidified and heated to have a dew point of 65° C. was supplied to the anode and air humidified and heated to have a dew point of 65° C. was supplied to the cathode. The rated operating conditions of this fuel cell were: 80% fuel utilization; 50% oxygen utilization; and 0.3 A/cm$^2$ current density. This fuel cell was subjected to a low load endurance test at a current density of 0.15 A/cm$^2$, which was 50% of the rated load, at the same gas utilization rates as those of the rated conditions.

The endurance test of the fuel cell of this example was performed by supplying each of the fuel gas and the oxidant gas to only one of the two divided gas flow channels on the same side at the predetermined flow rate. As a result, this fuel cell exhibited a high voltage of 98% of the initial voltage after 10,000 hours, which confirmed that this fuel cell had excellent durability. Under the operating conditions where the dew point of the supplied gas is somewhat lower than the operating temperature of the fuel cell, arranging the anode-side and cathode-side gas flow channels mainly perpendicular to one another effectively evenly distributes the humidity within a unit cell.

Thereafter, an endurance test was performed at a fuel utilization of 75%, an oxygen utilization of 40%, and a current density of 0.075 A/cm². The load was about 25% of the rating. Since the gas utilization rates of the rated operating conditions were set slightly high, stable operation was possible even at the 25% load, without significant decrease of the gas utilization rates. As a result, the fuel cell exhibited a high voltage of 97% of the initial voltage after 10,000 hours.

EXAMPLE 8

In this example, a fuel cell was produced using the separator plates of Embodiment 7. The groove width and depth of the gas flow channel were adjusted to 0.5 mm such that the gas velocity would be the same as that of the separator plates of Example 1. Except for these differences, the fuel cell had the same constitution as that of Example 1.

This fuel cell was subjected to a 50% low load operation endurance test by operating the fuel cell at half the rated load, under the same conditions as those of Example 1, and supplying each gas to a limited gas supply region on both the anode side and the cathode side at half the flow rate of the rating. As a result, the same results as those of Example 1 were obtained.

EXAMPLE 9

In this example, a fuel cell was produced using the separator plates of Embodiment 8.

This fuel cell was subjected to a 66% low load operation endurance test by operating the fuel cell at 66% of the rated load, under the same conditions as those of Example 1, and supplying each gas to a limited gas supply region on both the anode side and the cathode side, i.e., supplying the gas to only two of the three divided gas flow channels at a flow rate of 2/3 of the rating. As a result, this fuel cell exhibited excellent durability in the same manner as in Example 1.

Subsequently, this fuel cell was subjected to a 33% low load operation endurance test by operating the fuel cell at 33% of the rated load, under the same conditions as those of Example 1, and supplying each gas to a limited gas supply region on both the anode side and the cathode side, i.e., supplying the gas to only one of the three divided gas flow channels at a flow rate of 1/3 of the rating. As a result, this fuel cell exhibited excellent durability in the same manner as in Example 1.

Figure 29:
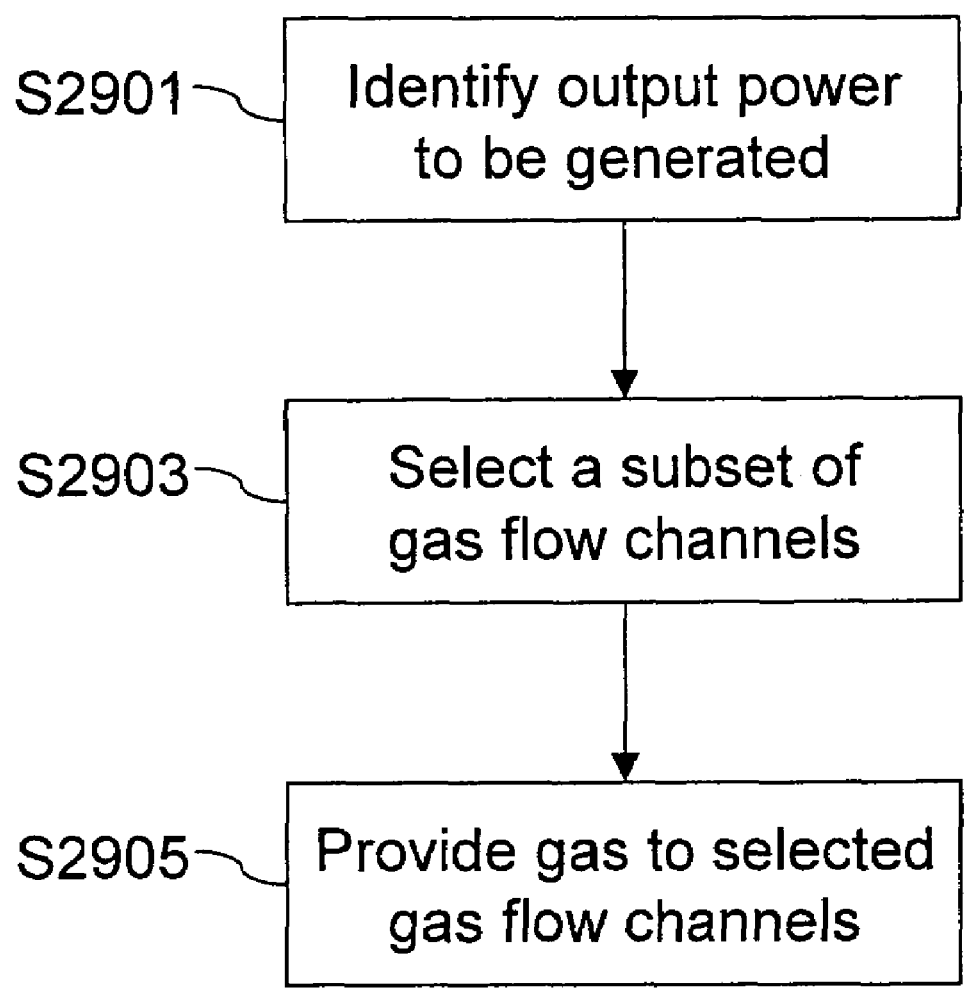
FIG. 29 illustrates another method of operating a fuel cell in accordance with the invention.

FIG. 29 illustrates a method of operating a fuel cell as described above. According to this method, an output power to be generated by the fuel cell is identified in Step S2901. Thereafter, a subset of a plurality of independent gas flow channels is selected in Step S2903 to receive the reagent gases. As described previously, the subset of gas flow channels may be selected such that a ratio of the sum of the sizes (e.g., volumes) of the independent gas flow channels within the subset to the sum of the sizes of all the independent gas flow channels is approximately equal to a ratio of the identified output power to the maximum output power of the fuel cell. Once the subset of gas flow channels is selected, gas is provided in Step S2905 to these channels so as to generate the identified amount of output power. In practice, this method may be applied to both the cathode and anode of a unit cell within a fuel cell stack, or it may be applied to only one of the cathode and anode electrodes of the unit cell. Additionally, the gas may be fuel gas or oxidant gas, as appropriate for the particular electrode to which it is provided.

EXAMPLE 10

In this example, a fuel cell was produced using the separator plates of Embodiment 9.

This fuel cell was subjected to a 75% low load operation endurance test by operating the fuel cell at 75% of the rated load, under the same conditions as those of Example 1, and supplying each gas to a limited gas supply region on both the anode side and the cathode side, i.e., supplying the gas to only three of the four divided gas flow channels at a flow rate of 3/4 of the rating. As a result, this fuel cell exhibited excellent durability in the same manner as in Example 1.

Subsequently, this fuel cell was subjected to a 50% low load operation endurance test by operating the fuel cell at half the rated load, under the same conditions as those of Example 1, and supplying each gas to a limited gas supply region on both the anode side and the cathode side, i.e., supplying the gas to only two of the four divided gas flow channels at a flow rate of one-half of the rating. As a result, this fuel cell exhibited excellent durability in the same manner as in Example 1.

Thereafter, this fuel cell was subjected to a 25% low load operation endurance test by operating the fuel cell at 25% of the rated load, under the same conditions as those of Example 1, and supplying each gas to a limited gas supply region on both the anode side and the cathode side, i.e., supplying the gas to only one of the four divided gas flow channels at a flow rate of 1/4 of the rating. As a result, this fuel cell exhibited excellent durability in the same manner.

EXAMPLE 11

In this example, a fuel cell was produced using the separator plates of Embodiment 10.

This fuel cell was subjected to a 50% low load operation endurance test by operating the fuel cell at half the rated load, under the same conditions as those of Example 1, and supplying each gas to a limited gas supply region on both the anode side and the cathode side, i.e., supplying the gas to only one of the two divided gas flow channels at a flow rate of one-half of the rating. As a result, this fuel cell exhibited excellent durability in the same manner as in Example 1.

EXAMPLE 12

In this example, a fuel cell was produced using the separator plates of Embodiment 11.

This fuel cell was subjected to a 50% low load operation endurance test by operating the fuel cell at half the rated load, under the same conditions as those of Example 1, and supplying each gas to a limited gas supply region on both the anode side and the cathode side, i.e., supplying the gas to only one of the two divided gas flow channels at a flow rate of one-half of the rating. As a result, this fuel cell exhibited excellent durability in the same manner as in Example 1.

It has been confirmed that in the low load operation of the fuel cell of this example, the electrode portion to which the gas is not supplied by the input manifold is nevertheless supplied with the gas, although in a very small amount, due to the underflow of gas through the gas diffusion layer. As a result, this electrode portion generates some electric power.

Then, after the lapse of 3,000 hours, each gas was supplied to only one of the divided gas flow channels at the predetermined flow rate, without switching between the gas flow channels, for another 1,000 hours, to perform a power generation test. During this test, the cell performance was maintained. Thereafter, with the load changed back to the rated condition (0.3 A/cm$^2$), each gas was supplied to both of the two divided gas flow channels.

In Example 1, after having been lowered, the cell performance gradually recovered and exhibited the initial rated power generation performance, but this recovery took about one day. That is, since one of the two divided gas flow channels was not supplied with gas for a long period of time, it became clogged with condensed water due to the underflow of gas, so it took about one day to fully return it to the original state after the gas supply was resumed.

In Example 12, however, since the two independent gas flow channels were close to each other, the amount of underflow of gas through the gas diffusion layer was larger than that experienced in Example 1. Therefore, the larger flow rate (i.e., underflow rate) of gas to the flow channel not receiving gas, from its corresponding input manifold, was sufficient to blow out the condensed water produced by underflow of the gas in this flow channel.

EXAMPLE 13

The fuel cell used in Example 1 was operated at a low load of 50% of the rating under the same operating conditions as those of Example 1. In this example, the switching of the gas supply was controlled by opening and closing the electromagnetic valves only on the supply side. That is, both of the electromagnetic valves on the exhaust side were kept open. It has been confirmed that this controlling method is also capable of successfully switching the gas supply. This fuel cell exhibited excellent durability in the same manner as in Example 1.

It has also been confirmed that the gas supply can be switched successfully by the method of keeping open the electromagnetic valves on the gas supply side and controlling the electromagnetic valves on the gas exhaust side.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

This application is based on Japanese Patent Application No. 2003-011139 filed on Jan. 20, 2003, the entire technical contents of which are expressly incorporated by reference herein.

What is claimed is:

1. A separator plate for a fuel cell, the separator plate comprising:
an anode-side face having a plurality of independent gas flow channels that each supply and discharge a fuel gas to and from a different power-generating region of an anode; and
a cathode-side face having a plurality of independent gas flow channels that each supply and discharge an oxidant gas to and from a different power-generating region of a cathode, wherein
the gas flow channels of the anode-side and cathode-side faces are aligned on the polar-opposite faces of the separator so that each anode power-generating region will have a single corresponding and co-extensive cathode power-generating region.

2. The separator plate in accordance with claim 1, wherein said plurality of independent gas flow channels comprise first and second independent gas flow channels having an area ratio which is not 1:1.

3. A fuel cell comprising:
a separator plate having a plurality of independent gas flow channels;
an electrode having a plurality of electrode sections that are physically separated from each other, said plurality of electrode sections corresponding to different ones of the plurality of independent gas flow channels so as to form a plurality of power-generating regions comprising at least two different subsets; and
a gas-supply switching controller that selects one of said at least two different subsets of the power-generating regions to receive gas through the corresponding independent gas flow channel so as to generate power in the selected power-generating region, wherein:
the electrode sections are separated by a water impermeable material, a reaction gas impermeable material, or both a water impermeable material and a reaction gas impermeable material.

4. A fuel cell comprising a gas-supply switching controller and stacked unit cells, each unit cell comprising:
an anode;
a cathode;
a hydrogen-ion conductive polymer electrolyte membrane interposed between said anode and said cathode;
an anode-side conductive separator plate having a gas flow path for supplying and discharging a fuel gas to and from said anode; and
a cathode-side conductive separator plate having a gas flow path for supplying and discharging an oxidant gas to and from said cathode, wherein:
said gas flow path of said anode-side separator plate comprises a plurality of independent gas flow channels, and said gas flow path of said cathode-side separator plate comprises a plurality of independent gas flow channels corresponding to said respective independent gas flow channels of said anode-side separator plate so that said anode and said cathode have a plurality of power-generating regions corresponding to said corresponding independent gas flow channels of said anode-side separator plate and said cathode-side separator plate, said plurality of power-generating regions comprising at least two different subsets, and
said gas-supply switching controller selects one of said at least two different subsets of the power-generating regions in each unit cell to receive the fuel gas and the oxidant gas so as to generate power in the selected power-generating region.

5. The fuel cell in accordance with claim 4, wherein said plurality of independent gas flow channels comprise first and second independent gas flow channels having an area ratio which is not 1:1.

6. The fuel cell in accordance with claim 4, wherein said anode comprises a catalyst layer and a gas diffusion layer, and one of the catalyst layer and the gas diffusion layer of said anode adjacent to said anode-side conductive separator plate comprises a plurality of sections corresponding to said plurality of independent gas flow channels of said anode-side conductive separator plate.

7. The fuel cell in accordance with claim 4, wherein said cathode comprises a catalyst layer and a gas diffusion layer, and one of the catalyst layer and the gas diffusion layer of said cathode adjacent to said cathode-side conductive separator plate comprises a plurality of sections corresponding to said plurality of independent gas flow channels of said cathode-side conductive separator plate.

8. The fuel cell in accordance with claim 4, further comprising a combination separator plate that includes said anode-side separator plate which further has a cooling water flow path in a backside thereof and said cathode-side separator plate which further has a cooling water flow path in a backside thereof, said anode-side separator plate and said cathode-side separator plate being combined together such that said cooling water flow paths form one integral cooling water flow path, wherein:
 (a) the integral cooling water flow path comprises a plurality of independent flow channels corresponding to said plurality of independent gas flow channels of said anode-side separator plate and said cathode-side separator plate; and
 (b) cooling water is supplied to one or more of said plurality of independent cooling water flow channels corresponding to said selected power-generating region.

9. A combination separator plate for a fuel cell, said combination separator plate comprising:
 an anode-side conductive separator plate having a plurality of independent gas flow channels, each supplying and discharging a fuel gas to and from a different power-generating region of an anode of the fuel cell; and
 a cathode-side conductive separator plate having a plurality of independent gas flow channels, each supplying and discharging an oxidant gas to and from a different power-generating region of a cathode of the fuel cell, wherein:
 said anode-side separator plate has a cooling water flow path in a backside thereof,
 said cathode-side separator plate has a cooling water flow path in a backside thereof,
 said anode-side separator plate and said cathode-side separator plate are combined together such that said cooling water flow paths form one integral cooling water flow path,
 the integral cooling water flow path comprises a plurality of independent flow channels corresponding to said plurality of independent gas flow channels of said anode-side separator plate and said cathode-side separator plate,
 the gas flow channels of the anode-side and cathode-side separator plates are aligned on the polar-opposite faces of the combined separator plate so that each anode power-generating region will have a single corresponding and co-extensive cathode power-generating region, and
 the cooling water flow channels are aligned with the gas flow channels of the anode-side and cathode-side separator plates so that each cooling water flow channel corresponds to a single co-extensive cathode power-generating region and a single co-extensive anode power-generating region.

10. A separator plate for a fuel cell, the separator plate comprising:
 a first plate face having a first plurality of independent gas flow channels, each supplying and discharging a fuel gas to and from a different power-generating region of an anode of the fuel cell; and
 a second plate face having a second plurality of independent gas flow channels, each supplying and discharging an oxidant gas to and from a different power-generating region of a cathode of the fuel cell, wherein
 the gas flow channels of the first and second plate faces are aligned on the polar-opposite first and second faces of the separator so that each anode power-generating region will have a single corresponding and co-extensive cathode power-generating region.

11. The separator plate of claim 10, wherein said first plurality of independent gas flow channels are serpentine.

12. The separator plate of claim 10, wherein said first plurality of independent gas flow channels are straight.

13. The separator plate of claim 10, wherein said first plurality of independent gas flow channels comprise pairs of gas flow channels that are interdigitated with one another.

14. The separator plate of claim 10, wherein said first plurality of independent gas flow channels and said second plurality of independent gas flow channels are serpentine and substantially perpendicular to one another.

15. The separator plate of claim 10, wherein said first plurality of independent gas flow channels and said second plurality of independent gas flow channels are serpentine and substantially parallel with one another.

16. The separator plate of claim 10, wherein said first plurality of independent gas flow channels include a depressed part having a plurality of ribs.

* * * * *